(12) United States Patent
Wigney

(10) Patent No.: US 11,522,231 B2
(45) Date of Patent: Dec. 6, 2022

(54) BATTERY WITH A VOLTAGE REGULATION DEVICE

(71) Applicant: VOLT TECHNOLOGY LIMITED, Auckland (NZ)

(72) Inventor: Andrew James Wigney, Auckland (NZ)

(73) Assignee: VOLT TECHNOLOGY LIMITED, Auckland (NZ)

( * ) Notice: Subject to any disclaimer, the term of this patent is extended or adjusted under 35 U.S.C. 154(b) by 51 days.

(21) Appl. No.: 16/944,138

(22) Filed: Jul. 30, 2020

(65) Prior Publication Data
US 2020/0365948 A1 Nov. 19, 2020

Related U.S. Application Data

(63) Continuation of application No. 15/758,022, filed as application No. PCT/NZ2016/050141 on Sep. 8, 2016, now Pat. No. 10,790,545.

(51) Int. Cl.
*H02J 7/00* (2006.01)
*H01M 10/42* (2006.01)
(Continued)

(52) U.S. Cl.
CPC ..... *H01M 10/425* (2013.01); *H01M 10/0525* (2013.01); *H01M 10/30* (2013.01);
(Continued)

(58) Field of Classification Search
None
See application file for complete search history.

(56) References Cited

U.S. PATENT DOCUMENTS

| 5,602,462 A | 2/1997 | Stich et al. |
| 6,119,938 A | 9/2000 | Agabra et al. |

(Continued)

FOREIGN PATENT DOCUMENTS

| CN | 201174405 Y | 12/2008 |
| CN | 201638904 U | 11/2010 |

(Continued)

OTHER PUBLICATIONS

European (EPO) Search Report in European Patent Application No. 16844778.7, dated Apr. 2, 2019 (12 pages).

(Continued)

*Primary Examiner* — Arun C Williams
(74) *Attorney, Agent, or Firm* — Burns & Levinson LLP; Joseph M. Maraia; Marlo Schepper Grolnic

(57) ABSTRACT

The invention relates to a battery (100) that works by regulating the power source (112) to provide a suitable voltage output so that the user's devices/products using the battery will have a high performance among several other advantages. The battery (100) comprises a positive terminal (102); a negative terminal (112); a power source (114); and a voltage regulation device (110). The voltage regulation device (110) is operatively connected to the positive terminal (102), the negative terminal (112) and the power source (114). The voltage regulation device (110) includes electronic components that are operatively connected to each other in order to regulate an output voltage in a programmed variable level.

13 Claims, 23 Drawing Sheets

(51) Int. Cl.
  *H01M 10/0525* (2010.01)
  *H01M 10/30* (2006.01)
  *H01M 10/052* (2010.01)

(52) U.S. Cl.
  CPC .......... *H02J 7/0047* (2013.01); *H02J 7/0048* (2020.01); *H02J 7/007182* (2020.01); *H01M 10/052* (2013.01); *H01M 2010/4271* (2013.01); *H02J 7/007* (2013.01); *H02J 7/0025* (2020.01); *H02J 7/0036* (2013.01); *H02J 2207/20* (2020.01)

(56) References Cited

U.S. PATENT DOCUMENTS

| | | | |
|---|---|---|---|
| 6,163,131 | A | 12/2000 | Gartstein et al. |
| 6,198,250 | B1 | 3/2001 | Gartstein et al. |
| 6,314,590 | B1 | 11/2001 | Lee |
| 7,633,261 | B2 | 12/2009 | Baron et al. |
| 10,026,997 | B2 | 7/2018 | Zhang et al. |
| 10,224,582 | B2 | 3/2019 | Zhang et al. |
| 2001/0048605 | A1* | 12/2001 | Kurokami ............... H02M 1/32 363/56.03 |
| 2003/0122523 | A1 | 7/2003 | Kim et al. |
| 2004/0113590 | A1 | 6/2004 | Rosenquist et al. |
| 2005/0264268 | A1* | 12/2005 | Ueno .................. H02J 7/0063 323/211 |
| 2008/0136367 | A1 | 6/2008 | Adest et al. |
| 2012/0153900 | A1* | 6/2012 | Schneider ................ H02J 7/00 320/128 |
| 2012/0319501 | A1 | 6/2012 | Cintra et al. |
| 2012/0235641 | A1* | 9/2012 | Yang ..................... H02J 7/0068 320/110 |
| 2013/0285633 | A1 | 10/2013 | Johnson |
| 2015/0207354 | A1 | 7/2015 | Naskali et al. |
| 2015/0349388 | A1 | 12/2015 | Haering et al. |
| 2016/0336762 | A1 | 11/2016 | Hunter et al. |

FOREIGN PATENT DOCUMENTS

| | | |
|---|---|---|
| CN | 2023081651 U | 7/2012 |
| CN | 101789524 B | 10/2013 |
| CN | 204668364 U | 9/2015 |
| CN | 205846086 U | 12/2016 |
| CN | 104993092 B | 3/2017 |
| CN | 108155423 A | 6/2018 |
| CN | 109193882 A | 1/2019 |
| JP | 2008-278668 A | 11/2008 |
| WO | 1997013189 A1 | 4/1997 |
| WO | 2015039583 A1 | 3/2015 |
| WO | 2015039584 A1 | 3/2015 |

OTHER PUBLICATIONS

WO, International Search Report; Application No. PCT/NZ2016/050141 (dated Dec. 9, 2016) (7 Pages).

WO, Written Opinion of the International Searching Authority; Application No. PCT/NZ2016/050141 (dated Dec. 9, 2016) (11 Pages).

WO, International Search Report; Application No. PCT/NZ2018/050025 (dated Jun. 20, 2018) (4 Pages).

WO, Written Opinion of the International Searching Authority; Application No. PCT/NZ2018/050025 (dated Jun. 20, 2018) (4 Pages)PCT/NZ2018/050025 (dated Jun. 20, 2018) (9 Pages).

* cited by examiner

BATTERY WITH A VOLTAGE REGULATION DEVICE

CROSS-REFERENCE TO RELATED APPLICATIONS

This application is a continuation of U.S. patent application Ser. No. 15/758,022, filed on 7 Mar. 2018, which is a U.S. National Stage Filing under 35 U.S.C. 371 from International Application No. PCT/NZ2016/050141, filed on 8 Sep. 2016 and published as WO/2017/043979 on 16 Mar. 2017, which claims the benefit of priority to New Zealand Patent Application No. 712039, filed on 8 Sep. 2015, which applications and publications are incorporated herein by referenced in their entirety.

FIELD OF THE INVENTION

The invention relates to a battery, preferably a rechargeable battery, comprising a voltage regulation device adapted to provide at least a regulated output voltage.

BACKGROUND OF THE INVENTION

Batteries are needed and used by almost every household worldwide. It is believed that a total of 350 AA and 150 AAA are batteries are purchased every second of every day. The main types of household batteries available are Alkaline, Lithium, Nickel-metal hydride (NiMH) and nickel-cadmium (NiCD) batteries. There are primary batteries which are non-rechargeable and secondary batteries which are re-chargeable using different form of power sources.

Alkaline Primary (Non-Rechargeable)

Alkaline batteries are a type of 'primary batteries' dependent upon the reaction between zinc and manganese dioxide ($Zn/MnO_2$).

Alkaline batteries are relatively low cost and have long shelf life. Furthermore, they are good in low power devices such as wall clocks and TV remote controls. However, these types of batteries are non-rechargeable/single use batteries that need to be disposed more frequently and therefore can be hazardous to the environment in terms of pollution. Additionally, these types of batteries are not very effective in high power devices. All non-rechargeable/single use alkaline batteries drop their output voltage when under load and hence products/devices such as flashlights/torches and cameras lose performance very quickly.

Lithium Primary (Non-Rechargeable)

Lithium batteries are non-reusable (primary) batteries that have lithium metal or lithium compounds as an anode.

These types of batteries are particularly useful for high current devices. However, similar to alkaline batteries, these batteries are also non rechargeable/single use batteries that need to be disposed more frequently and therefore can be hazardous to the environment in terms of pollution. Furthermore, in terms of costs, these types of batteries are relatively expensive for a non-rechargeable/single use battery.

NiMH/NICd Secondary (Rechargeable)

A nickel-metal hydride battery, abbreviated NiMH or Ni-MH, is a type of rechargeable battery using hydrogen as the active element at a hydrogen-absorbing negative electrode (anode). Similarly, a nickel-cadmium battery (NiCd battery or NiCad battery) is a type of rechargeable battery using nickel oxide hydroxide and metallic cadmium as electrodes.

These types of batteries are rechargeable and hence can be used again and again thereby saving money after multiple uses. However, these types of batteries have a lower output voltage (1.2V) than non-rechargeable/single use batteries and therefore are not suitable for all types of products/devices. Furthermore, some of the known batteries have self-discharge rates. These types of regular rechargeable batteries also drop their output voltage when under load. Even though, different brands of batteries have different output voltage reductions, overall devices/products such as torches and cameras lose performance relatively quickly regardless of what type or brand of battery is used.

There are some rechargeable batteries available on the market each having a built-in voltage regulator that do not allow the output voltage to drop under load and allow a constant 1.5 V output. Although, this may seem advantageous, it can burn out many LED and incandescent torches as the bulbs are generally manufactured with assumption that the voltage will drop under current load. Furthermore, these kind of rechargeable batteries require special/customized chargers.

With regular batteries (Alkaline 1.5V disposable, Lithium 1.5V primary and NiMH 1.2V rechargeable), under load the voltage drops slightly even when the batteries are new and fully charged. Some electronics is designed with this in mind such as many flashlights where the bulbs are not rated at 1.5V but are rated at a slightly lower voltage, for example 1.4V.

A fixed 1.5V output will in some cases damage the electronics. Some electronic devices are built with the assumption that regular 1.5V disposable (Primary) batteries or 1.2V rechargeable (Secondary) batteries will be used. These batteries very quickly drop in output voltage under load.

For example, flashlight bulbs, both LED and incandescent, are not generally manufactured to be able to operate at a full 1.5V Direct Current (DC) (or multiple of 1.5V if multiple batteries are used) but rather between 1.2V and 1.4V. Use of fixed 1.5V DC batteries will burn out some flashlight bulbs.

There are major technical difficulties in designing the electronics to provide an intelligent regulated output voltage and also to sense the connection to a battery charger and regulate the input voltage to allow the internal cell (power source) to charge. It is not generally known or easy to have electronics within the battery. Also, it is not generally known or easy to regulate the voltage output in battery or to include a circuit within a battery. Since batteries are functionally limited by size and shape to work in devices, it can often be difficult fitting additional electronic components within a battery without changing the size and shape of the battery while also providing a battery with a high power capacity, i.e. not reducing the size of the power source within the battery. It can often be difficult to add electronics to a battery whilst reducing the risk of electronics draining the battery power. Also, it is generally unknown to control charging of the battery to allow recharging using multiple recharging devices without requiring additional removable or movable components or specific adaptors/connectors for recharging the battery. There can also be technical difficulties in optimizing and miniaturizing the electronics so that it would fit in a smaller battery (such as AA and AAA battery) without taking up too much space—the more space the electronics take up, the less space there is for power source (such as Li-ion cell) and therefore the lower the battery capacity.

U.S. Pat. Nos. 8,314,590 and 7,633,261 B2 both disclose batteries with fixed voltage outputs. However, they do not disclose any battery that provide or could provide intelligent variable output.

U.S. Pat. No. 8,314,590 discloses a battery that requires charging using a USB connection. Similarly, CN201174405 Discloses a battery that requires a special proprietary battery charger. Furthermore, those documents do not disclose a battery that could provide intelligent variable output.

There is a need for a battery that works by regulating a power source (such as 3.7 V internal Li-ion cell) with micro-electronics to provide a suitable voltage output so that the user's devices/products using the battery will have a continuous high performance (and in case of a rechargeable battery, a continuous high performance until the battery needs a recharge). Also, as mentioned above, if the output voltage of the battery is not regulated but is set to a constant 1.5V, products/devices such as torches can burn out and therefore there is also a need for a battery that allows the output voltage to be regulated between a certain range, most preferably between 0.25V and 1.5V, so that the chance of products/devices such as torches being burnt out is eliminated or at least reduced. Furthermore, in one option, there is a need for a battery that has electronics that regulate the input charge voltage so that the battery can be charged using existing NiMH/NiCd battery chargers.

Object of the Invention

It is an object of the invention to provide an improved battery which will obviate or minimize some or all of the foregoing disadvantages in a simple yet effective manner or which will at least provide the public with a useful choice.

Prior References

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications may be referred to herein; this reference does not constitute an admission that any of these documents form part of the common general knowledge in the art, in New Zealand or in any other country.

Definitions

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to the apparatus and/or one or more steps in a method or process.

Unless otherwise specifically noted, the term "battery" refers to a container or product comprising an internal chemical energy power source. For example, the container or product may be in AA, AAA, C, D or any other size and format.

Unless otherwise specifically noted, the term "power source" refers to a source of power for a battery comprising one or more cells, in which chemical energy is converted into electricity. For example, Li-ion cell, NiMH cell, NiCd cell, $ZN/MNO_2$ cell or other such chemical power sources. The power source may optionally be rechargeable.

Unless otherwise specifically noted, the term "Li-ion cell" is intended to mean internal Lithium ion (Li-ion) cell that is one exemplary form of a power source for the battery.

SUMMARY OF THE INVENTION

In a first aspect, the invention resides in a battery comprising:
a positive terminal;
a negative terminal;
a power source; and
a voltage regulation device that is operatively connected to the positive terminal, the negative terminal and the power source,
wherein the voltage regulation device includes electronic components that are operatively connected to each other to regulate an output voltage in a programmed variable level.

Preferably, the battery is a rechargeable battery with a rechargeable power source.

Preferably, wherein the power source is a Li-ion cell.

Preferably, the power source provides power to the voltage regulation device via one or more wires.

Preferably, the Li-ion cell is between 2.8 to 3.7 volts.

Preferably, the voltage regulation device comprises a programmable controller that is operatively connected to the positive terminal, the negative terminal, the power source and to one or more of the other electronic components of the voltage regulation device to send and receive input and output signals and thereby to sense and regulate an output voltage in the programmed variable level.

Preferably, the voltage regulation device comprises at least one regulator, the at least one regulator being operatively connected to the programmable controller and is adapted to be activated by the programmable controller at a preset battery output level in order to regulate the output voltage.

Preferably, the power source is rechargeable and the voltage regulation device comprises at least one voltage sensor configured to determine an input voltage that charges the power source, the at least one voltage sensor being operatively connected to the programmable controller, the programmable controller being adapted to receive at least one input signal from the at least one voltage sensor to regulate the input voltage.

Preferably, the voltage regulation device comprises at least one voltage sensor configured to determine a voltage level information of the power source and feed the voltage level information to the programmable controller.

Preferably, the programmable controller is programmed to provide a lower output voltage if the power source voltage has dropped to a pre-determined level.

Preferably, the voltage regulation device comprises at least one current sensor configured to determine an output current in a power source, the at least one current sensor being operatively connected to the programmable controller, the programmable controller being adapted to receive at least one input signal from the at least one current sensor and regulate the output voltage according to the output current at the programmed variable level.

Preferably, the voltage regulation device comprises at least one current sensor adapted to detect a connection to a battery charger, the at least one current sensor being operatively connected to the programmable controller.

Preferably, the voltage regulation device comprises at least one current sensor that is operatively connected to the programmable controller, the at least one current sensor is adapted to detect two or more of the following: i) a current being drained by a user's product/device during use; ii) a current being used in the rechargeable power source during discharge; to iii) a current being drained from the power source; and iv) a current being charged to the power source, if the power source is rechargeable.

Preferably, the power source is rechargeable and the voltage regulation device comprises at least one charger sensor that is adapted to determine a connection to a battery charger by detecting a voltage from the battery charger, the at least one charge sensor being operatively connected to the programmable controller.

Preferably, the power source is rechargeable and the voltage regulation device comprises at least one charger sensor that is adapted to detect a voltage of a battery charger as a voltage level information and feed the voltage level information to the programmable controller in order to regulate the detected voltage of the battery charger for charging the power source.

Preferably, the power source is rechargeable and the voltage regulation device comprises at least one charger sensor that is adapted to detect a voltage level information from a battery charger and feed the voltage level information to a programmable controller in order to regulate the output voltage according to the output current at the programmed variable level.

Preferably, the power source is rechargeable and the voltage regulation device comprises a voltage boost regulator that is operatively connected to the programmable controller, the programmable controller being adapted to receive at least one input signal from the voltage boost regulator to allow the voltage boost regulator to increase a voltage supplied from a battery charger to a higher voltage to charge the power source.

Preferably, the voltage regulation device comprises a voltage buck regulator that is operatively connected to the programmable controller, the programmable controller being adapted to receive at least one input signal from the voltage buck regulator to allow the voltage buck regulator to convert a voltage supplied by the power source to the output voltage of the battery.

Preferably, the voltage regulation device comprises wherein the voltage regulation device comprises a noise suppression circuit that is operatively connected to the programmable controller, the programmable controller being adapted to receive at least one input signal from the noise suppression circuit for noise suppression.

Preferably, the battery includes a voltage level indicator for providing an indication of the voltage level of the power source.

Preferably, the programmable controller is programmed to monitor the current and/or voltage level of the power source based on the input and output signals, and the programmable controller is operatively connected to the voltage level indicator in order provide an indication when the battery approaches the end of a discharge.

Preferably, the battery comprises a housing that is adapted to house at least the power source and the voltage regulation device.

Preferably, the battery is an AA battery or an AAA battery.

Preferably, the regulated output voltage is in a range between 1.2V and 1.5V.

Preferably, the regulated output voltage is in a range between 1.25V and 1.5V.

In a second aspect, the invention resides in a voltage regulation device for regulating at least an output voltage of a battery at a programmed variable level, the voltage regulation device comprising:

a current sensing circuit that is adapted to sense the output current in a power source of the battery; and a programmable controller is adapted to receive at least one input signal from the current sensing circuit and regulate the output voltage according to the output current at a programmed variable level.

Preferably, the power source is a rechargeable power source.

Preferably, the voltage regulation device comprises at least one regulator, the at least one regulator being operatively connected to the programmable controller and is adapted to be activated by the programmable controller at a preset battery output level in order to regulate the output voltage.

Preferably, the voltage regulation device comprises at least one voltage sensor configured to determine an input voltage that charges the power source, the at least one voltage sensor being operatively connected to the programmable controller, the programmable controller being adapted to receive at least one input signal from the at least one voltage sensor to regulate the input voltage.

Preferably, the voltage regulation device comprises at least one voltage sensor configured to determine a voltage level information of the power source and feed the voltage level information to the programmable controller.

Preferably, the programmable controller is programmed to provide a lower output voltage if the power source voltage has dropped to a pre-determined level.

Preferably, the power source is rechargeable and the current sensing circuit is adapted to a connection to a battery charger, the at least one current sensor being operatively connected to the programmable controller.

Preferably, the current sensing circuit is adapted to detect at least two of the following: i) a current being drained by a user's product/device during use; ii) a current being used in the power source during discharge; iii) a current being drained from the power source; iv) a current being charged to the power source, if the power source is rechargeable.

Preferably, the power source is rechargeable and the voltage regulation device comprises at least one charger sensor that is adapted to determine a connection to the battery charger by detecting a voltage from the battery charger, the at least one charge sensor being operatively connected to the programmable controller.

Preferably, the power source is rechargeable and the voltage regulation device comprises at least one charger sensor adapted to detect a voltage of the battery charger as a voltage level information and feed the voltage level information to the programmable controller in order to regulate the detected voltage of the battery charger for charging the rechargeable power source.

Preferably, the power source is rechargeable and the voltage regulation device comprises at least one charger sensor adapted to detect a voltage level information from the battery charger and send the voltage level information to the programmable controller in order to regulate the output voltage according to the output current at the programmed variable level.

Preferably, the power source is rechargeable and the voltage regulation device comprises a voltage boost regulator that is operatively connected to the programmable controller, the programmable controller being adapted to receive at least one input signal from the voltage boost regulator to allow the voltage boost regulator to increase a voltage supplied from an battery charger to a higher voltage to charge the power source.

Preferably, the voltage regulation device comprises a voltage buck regulator that is operatively connected to the programmable controller, the programmable controller being adapted to receive at least one input signal from the voltage buck regulator to allow the voltage buck regulator to convert a voltage supplied by the power source to the output voltage of the battery.

Preferably, the voltage regulation device comprises wherein the voltage regulation device comprises a noise suppression circuit that is operatively connected to the programmable controller, the programmable controller being adapted to receive at least one input signal from the noise suppression circuit for noise suppression.

Preferably, the programmable controller is programmed to monitor the current and/or voltage level of the power source based on the input and output signals, and the programmable controller is operatively connected to the voltage level indicator in order provide an indication when the battery approaches the end of a discharge.

In a third aspect, the invention resides in a battery comprising:
  a positive terminal;
  a negative terminal;
  a power source; and
  a voltage regulation device operatively connected to the positive terminal, the negative terminal and the power source,
  wherein the voltage regulation device is adapted to regulate the output voltage in a programmed variable level.

Preferably, the power source is a rechargeable power source.

Preferably, the power source is a Li-ion cell.

Preferably, the power source provides power to the voltage regulation device via one or more wires.

Preferably, the Li-ion cell is between 2.8 V to 3.7V.

Preferably, the voltage regulation device is adapted to sense and regulate an input voltage that charges the power source.

Preferably, the voltage regulation device is adapted to sense the output current and adjust the output voltage according to the output current.

Preferably, the voltage regulation device is adapted to sense a connection to a battery charger when the battery is a rechargeable battery.

Preferably, the battery is a rechargeable battery and the voltage regulation device is adapted to sense a connection to a battery charger and detect the voltage of the battery charger in order to regulate the detected voltage of the battery charger for charging the rechargeable power source.

Preferably, the battery comprises a housing that is adapted to house at least the power source and the voltage regulation device.

Preferably, the battery is an AA battery or an AAA battery.

Preferably, the regulated output voltage is in a range between 1.2V and 1.5V, more preferably between 1.25V and 1.5V.

Preferably, the voltage regulation device is adapted to monitor the current and/or voltage level of the power source and provide an indication to a user when the battery approaches the end of the discharge.

Preferably, the battery includes a voltage level indicator for providing an indication of the voltage level of the power source.

Preferably, the voltage regulation device comprises at least:
  a current sensing circuit that is adapted to sense the output current in a power source of the battery; and
  a programmable controller is adapted to receive at least one input signal from the current sensing circuit and regulate the output voltage according to the output current at the programmed variable level.

Preferably, the voltage regulation device comprises at least one regulator that is adapted to be activated by the programmable controller at a preset battery output current level in order to regulate the output voltage.

Preferably, the battery is a rechargeable battery and the voltage regulation device comprises a charge sensor that is adapted to detect a voltage level information from a battery charger and send the voltage information to a programmable controller in order to regulate the output voltage according to the output current at the programmed variable level.

Preferably, the voltage regulation device comprises a voltage sensor adapted to sense the voltage level information of the power source and feed the voltage level information to the programmable controller, wherein the programmable controller is programmed to provide a lower output voltage if the power source voltage has dropped to a pre-determined level.

Preferably, the voltage regulation device comprises:
  a) A current sensing circuit adapted to detect at least two of the following i) a current being drained by a user's product/device; ii) a current being used in a power source of the battery during discharge; iii) a current being drained from the power source;
  b) A voltage buck regulator adapted to convert a voltage supplied by the power source to the output voltage of the battery;
  c) A programmable controller adapted to receive input signals at least from the current sensing circuit and the voltage buck regulator to control and regulate the output voltage of the battery at a programmed variable level.

Preferably, the voltage regulation device comprises a plurality of electronic components operatively connected to each other for noise suppression.

Preferably, the voltage regulation device includes a rechargeable power source and comprises:
  a) a current sensing circuit adapted to detect at least two of the following: i) a current being drained by a user's product/device; ii) a current being used in a power source of the battery during discharge; iii) a current being drained from the rechargeable power source; iv) a current being charged to the rechargeable power source;
  b) a voltage boost regulator adapted to increase a voltage supplied from an external battery charger to a higher voltage to charge the rechargeable power source;
  c) a voltage buck regulator adapted to convert a voltage supplied by the power source to the output voltage of the battery;
  d) a programmable controller adapted to receive input signals at least from the current sensing circuit, the voltage boost regulator, the voltage buck regulator, and control and regulate the output voltage of the battery at a programmed variable level.

Preferably, the voltage regulation device comprises a plurality of electronic components operatively connected to each other for noise suppression.

Preferably, the voltage regulation device includes a rechargeable power source and comprises:
  a) a first current sensing circuit adapted to sense/detect any current being drained by a user's product/device and a current being used in the rechrgable power source of the battery during discharge;

b) a voltage boost regulator adapted to increase a voltage supplied from an external battery charger to a higher voltage to charge the rechargeable power source;

c) a voltage buck regulator adapted to convert a voltage supplied by the rechargeable power source to the output voltage of the battery;

d) a second current sensing circuit adapted to sense/detect a current being supplied by an external battery charger and a current being charged to the rechargeable power source;

e) a programmable microcontroller adapted to receive input signals at least from the first current sensing circuit, the voltage boost regulator, the voltage buck regulator, the second current sensing circuit and control and regulate the output voltage of the battery at a programmed level.

Preferably, the voltage regulation device comprises a plurality of electronic components operatively connected to each other for noise suppression.

Preferably, the voltage regulation device comprises a microcontroller voltage regulation device adapted to regulate the voltage of the microcontroller; the microcontroller voltage regulation device being located external to the microcontroller and is adapted to regulate the voltage of the microcontroller.

Preferably, the output voltage of the battery is controlled and regulated at a programmed level between 1.2V and 1.5V, more preferably between 1.25V and 1.5V.

Preferably, the first and second current sensing circuits each comprise at least two resistors and one capacitor that are operatively connected to each other.

Preferably, the voltage boost regulator comprises at least an N-channel MOSFET, four resistors, a diode and a capacitor that are operatively connected to each other.

Preferably, the voltage buck regulator comprises at least a P-channel MOSFET, diode and two resistors that are operatively connected to each other.

Preferably, the plurality of electronic components for noise suppression comprises at least four capacitors and an inductor that are that are operatively connected to each other.

Preferably, the microcontroller voltage regulation device comprises at least a resistor and a diode that are operatively connected to each other.

In a fourth aspect, the invention resides in a voltage regulation device for regulating at least an output voltage of a battery at a programmed variable level, the voltage regulation device comprising at least:

a current sensing circuit that is adapted to sense the output current in a power source of the battery; and a programmable controller that is adapted to receive at least one input signal from the current sensing circuit and regulate the output voltage according to the output current at a programmed variable level.

Preferably, the power source is a rechargeable power source.

Preferably, the voltage regulation device further comprises at least one regulator that is adapted to be activated by the programmable controller at a preset battery output current level in order to regulate the output voltage.

Preferably, the voltage regulation device includes a rechargeable power source and further comprises a charge sensor that is adapted to detect a voltage level information from a battery charger and send the voltage information to the programmable controller in order to regulate the output voltage according to the output current at the programmed variable level.

Preferably, the voltage regulation device further comprises a voltage sensor adapted to sense the voltage level information of the power source and feed the voltage level information to the programmable controller, wherein the programmable controller is programmed to provide a lower output voltage if the power source voltage has dropped to a pre-determined level.

In a fifth aspect, the invention resides in a battery comprising:

a positive terminal;
a negative terminal;
a power source; and
a voltage regulation device operatively connected to the positive terminal, the negative terminal and the power source, wherein the voltage regulation device comprises a current sensing circuit that is adapted to sense the output current in a power source of the battery; and a programmable controller is adapted to receive at least one input signal from the current sensing circuit and regulate the output voltage according to the output current at a programmed variable level.

The battery may optionally be a rechargeable battery having a rechargeable power source.

In a sixth aspect, the invention resides in a voltage regulation device for controlling and regulating a voltage supplied from an external battery charger to charge a rechargeable power source of a battery, the voltage regulation device comprising:

a) a voltage boost regulator adapted to increase a voltage supplied from the external battery charger to a higher voltage to charge the power source;

b) a current sensing circuit adapted to sense/detect a current being supplied by the external battery charger an a current being charged to the power source;

c) a programmable microcontroller adapted to receive input signals at least from the current sensing circuit and the voltage boost regulator to control and regulate the voltage supplied for recharging the rechargeable power source of a battery.

In another aspect, the invention resides in a voltage regulation device for controlling and regulating at least an output voltage of a rechargeable battery at a programmed level, the voltage regulation device comprising:

a) a first current sensing circuit adapted to sense any current being drained by a user's product/device and the current being used in a power source of the battery during discharge;

b) a voltage boost regulator adapted to increase a voltage supplied from an external battery charger to a higher voltage to charge the power source;

c) a voltage buck regulator adapted to convert a voltage supplied by the power source to the output voltage of the battery;

d) a second current sensing circuit adapted to sense/detect a current being supplied by an external battery charger and a current being charged to the power source;

e) a programmable microcontroller adapted to receive input signals at least from the first current sensing circuit, the voltage boost regulator, the voltage buck regulator, the second current sensing circuit and control and regulate the output voltage of the battery at a programmed level.

Preferably, the voltage regulation device comprises a plurality of electronic components operatively connected to each other for noise suppression.

Preferably, the voltage regulation device comprises a microcontroller voltage regulation device adapted to regulate the voltage of the microcontroller; the microcontroller voltage regulation device being located external to the microcontroller and is adapted to regulate the voltage of the microcontroller.

Preferably, the output voltage of the battery is controlled and regulated at a programmed level between 1.2V and 1.5V, more preferably between 1.25V and 1.5V.

Preferably, the first and second current sensing circuits each comprise at least two resistors and one capacitor that are operatively connected to each other.

Preferably, the voltage boost regulator comprises at least an N-channel MOSFET, four resistors, a diode and a capacitor that are operatively connected to each other.

Preferably, the voltage buck regulator comprises at least a P-channel MOSFET, diode and two resistors that are operatively connected to each other.

Preferably, the plurality of electronic components for noise suppression comprises at least four capacitors and an inductor that are that are operatively connected to each other.

Preferably, the microcontroller voltage regulation device comprises at least a resistor and a diode that are operatively connected to each other.

In a yet further aspect, the invention resides in a battery comprising the voltage regulation device as defined in any one or more of the statements above.

BRIEF DESCRIPTION OF DRAWINGS

The invention will now be described, by way of example only, by reference to the accompanying drawings.

DETAILED DESCRIPTION OF THE PREFERRED EMBODIMENT(S)

The following description will describe the invention in relation to preferred examples. The invention is in no way limited to the example(s) and/or drawings as they are purely to exemplify the invention only and that possible variations and modifications would be readily apparent without departing from the scope of the invention.

Figure 1:
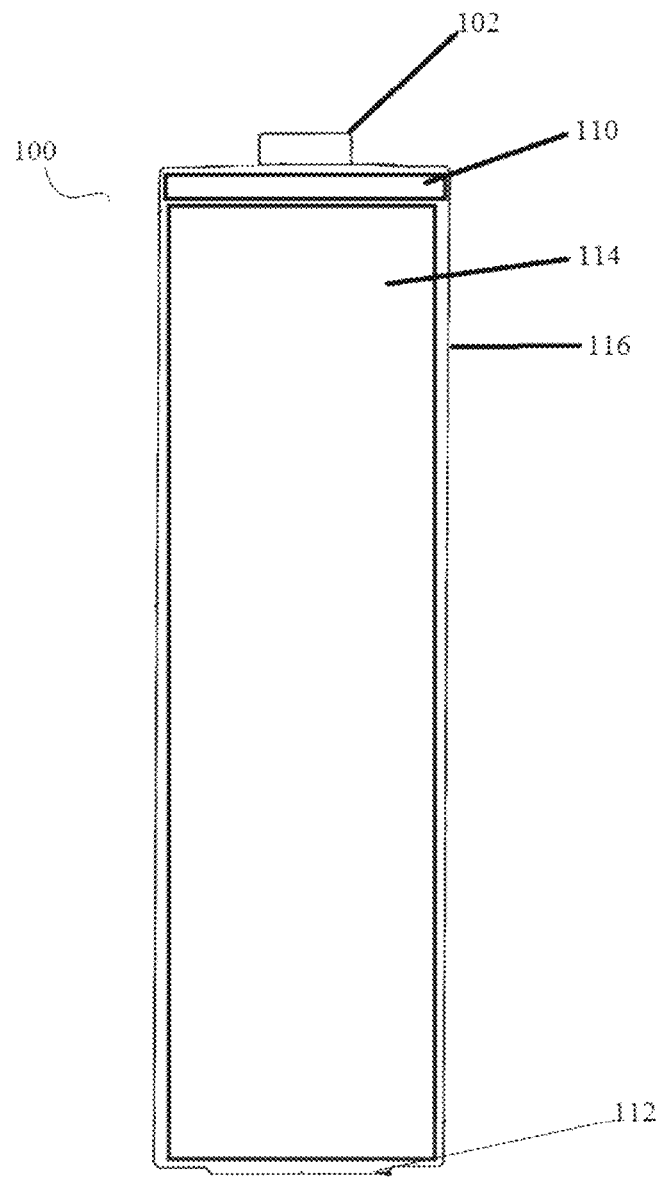
FIG. 1 shows a first embodiment of a rechargeable battery according to the present invention and some internal components of the battery are also shown.
Figure 2:
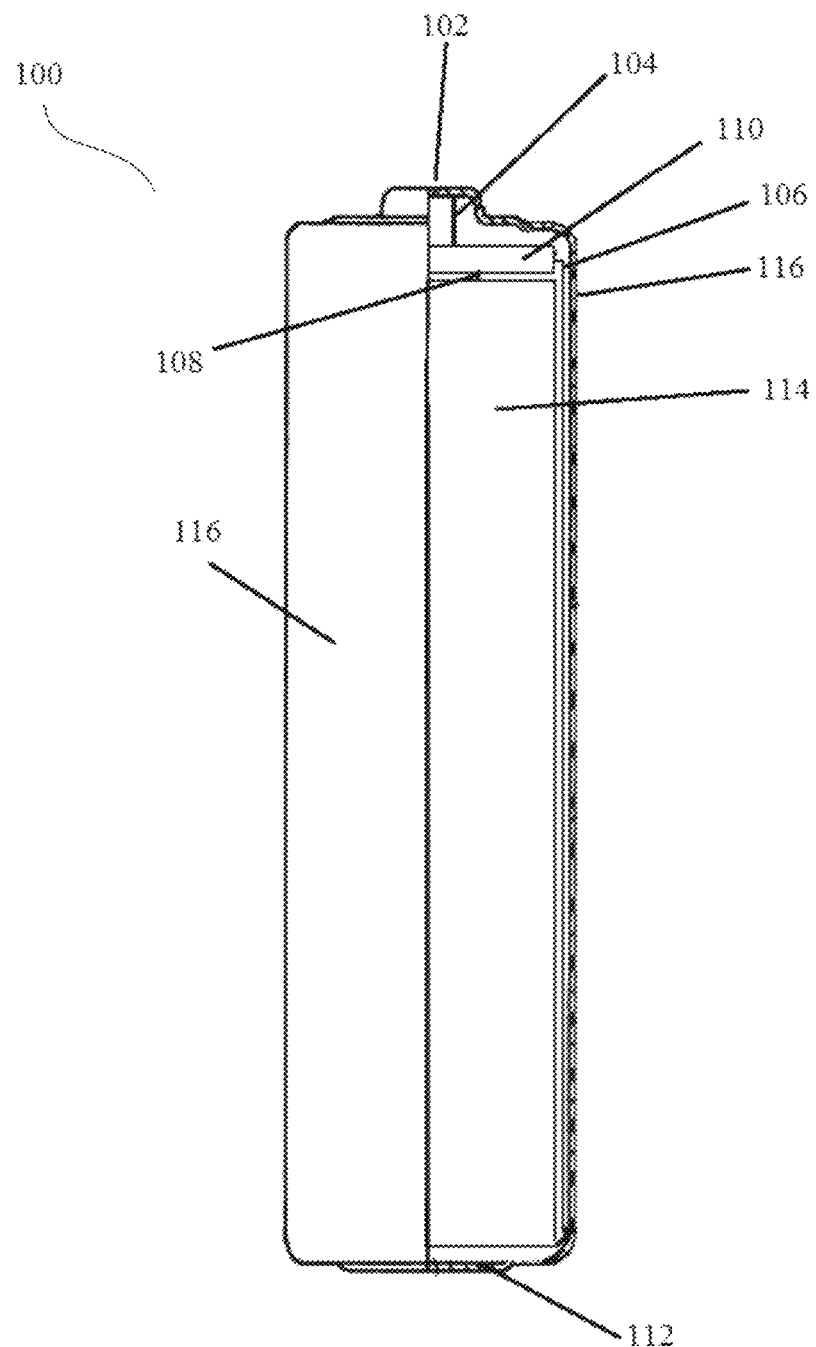
FIG. 2 is a cut away view of the first embodiment of the battery of FIG. 1.

FIG. 1 and FIG. 2 show one embodiment of a battery (100) of the present invention comprising electronic components being operatively connected to each other. In one form, the battery (100) is an AA or AAA sized rechargeable lithium ion (Li-ion) battery of a predetermined voltage, preferably 3.2 volts (V) to 3.8 V, such as 3.7 V. The battery (100) includes a positive terminal (102) operatively connected by a voltage carrying means, such as a first wire (104) to a voltage regulation device (110) comprising a circuitry at least for voltage regulation. The voltage regulation device (110) will hereinafter be referred to as a voltage regulation circuit (110). Therefore, the first wire (104) electrically connects the positive terminal (102) of the battery to the voltage regulation circuit (110).

The voltage regulation circuit (110) comprises electronic components in a suitable electrically connected arrangement. A circuit diagrams depicting two of the exemplary arrangements of the electronic components in the voltage regulation circuit (110) will be discussed later with reference to FIGS. 3 (a)-(c) and FIGS. 4 (a)-(i).

Referring back to FIGS. 1 and 2, the voltage regulation circuit (110) is further connected by another voltage carrying means, preferably a second wire (106) to a negative terminal (112). The voltage regulation circuit (110) is also connected by one or more wires (108) to an internal cell (114), which in this example is a 2.6 V to 4.6 V Li-ion cell such as a 3.7 V Li-ion cell. The battery (100) further comprises housing or a shell (116) made out of any suitable material shaped and constructed to house the electronic components of the battery. The shell (116) surrounds, protects and encapsulates the electronic components of the battery (100). Preferably, the shell (116) is made of a very thin (approximately 1 mm thick) metal. The shell in this one example is shaped as an enclosed tube with a first (e.g. bottom) section and a second (e.g. top) section whereby the second section of the shell is attached after the assembly.

The voltage regulation circuit (110) is at least adapted to regulate the output voltage in a programmed variable level and/or to sense and regulate the input voltage that charges the internal cell (114). The internal cell (114) is adapted to provide power to the voltage regulation circuit (110) via the one or more wires (108). These one or more wires (108) are adapted to be used for both the charge and discharge of the internal cell (114). The internal cell (114) is preferably any power source, however the examples describe use of a Li-ion cell. A person skilled in the art will understand that a similar system may be developed for an alternative power source, particularly rechargeable power source.

The voltage regulation circuit (110) may comprise at least one voltage sensor that configured to determine an input voltage that charges the power source, the power source being the internal cell (114). The voltage sensors(s) are operatively connected to the programmable controller. The programmable controller is adapted to receive at least one input signal from the at least one voltage sensor to regulate the input voltage.

The voltage sensor may be configured to determine a voltage level information of the power source and feed the voltage level information to the programmable controller. The programmable controller is programmed to provide a lower output voltage of the power source.

Exemplary embodiment(s) of a voltage sensor circuit will be described later in more detail.

Similarly, the voltage regulation circuit (110) may comprise at least current sensor that is configured to determine an output current in the internal cell (114). The at least one current sensor is also operatively connected to a programmable controller that is adapted to receive at least one input signal from the at least one current sensor and regulate the output voltage according to the output current at the programmed variable level.

The current sensor(s) may be adapted to detect a connection to a battery charger when operatively connected to the programmable controller.

The current sensor (s) may also be adapted to detect two or more of the following: i) a current being drained by a user's product/device during use; ii) a current being used in the internal cell (110) during discharge; iii) a current being drained from the internal cell (110); and iv) a current being used to recharge the internal cell (110), if the internal cell (110) is rechargable.

Exemplary embodiment(s) of a current sensor circuit will be described later in more detail.

The voltage regulation circuit (110) will be described with reference to two exemplary embodiments. Although, the circuit has been referred to as voltage regulation circuits (110) it is to be understood that voltage regulation is not necessarily the sole purpose of the voltage regulation circuit (100). Some of the other functions of the voltage regulation circuit (110) have been described later.

Figure 3:
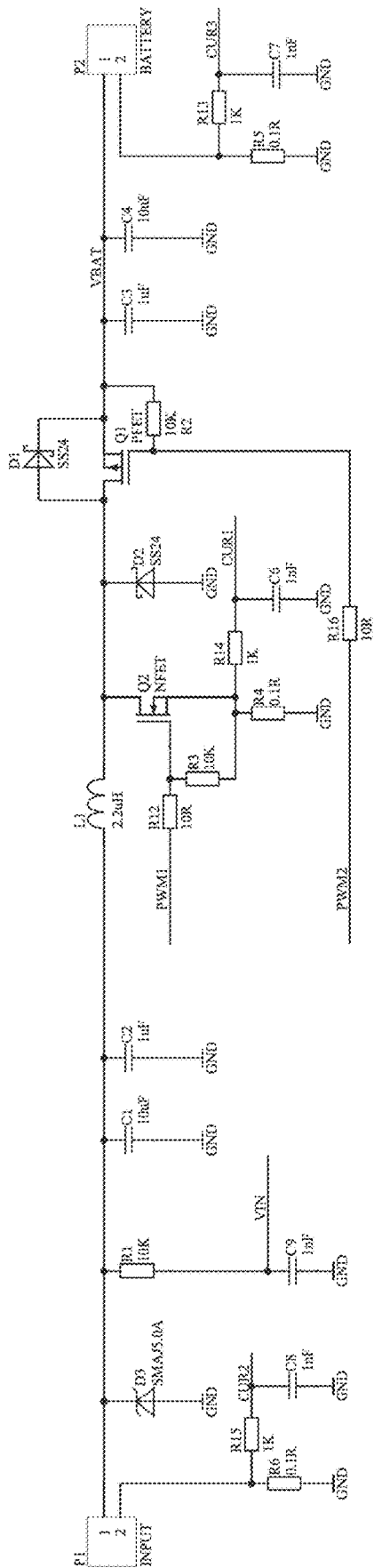
FIGS. 3(a)-(c) together show a schematic diagram of a first embodiment of a voltage regulation circuit to be used in the battery of FIGS. 1 and 2.

First Embodiment of the Voltage Regulation Circuit
(FIGS. 3 (a)-(c))

FIGS. 3 (a)-(c) together show the circuit diagram of one form of a voltage regulation circuit (110) that may be used in the battery (100) of the present invention. As it can be seen from FIGS. 3(a)-(c), the voltage regulation circuit (110) comprises several electronic components that are electronically and operatively connected to each other. The values and units of most of those electronic components are also shown. To a person skilled in the art, arrangement and the functionality of the voltage regulation circuit (110) will be self-explanatory upon consideration of the schematic diagrams of FIGS. 3 (a)-(c) and therefore need not be discussed in detail.

Figure 3B:
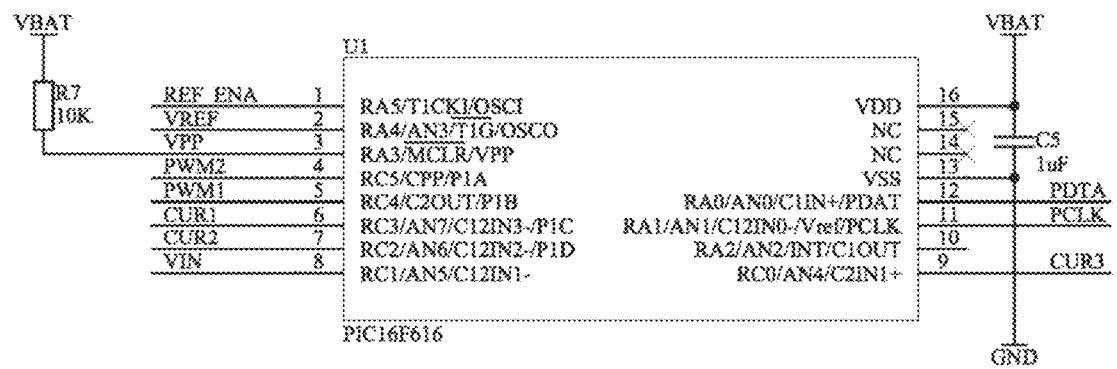
Figure 3C:
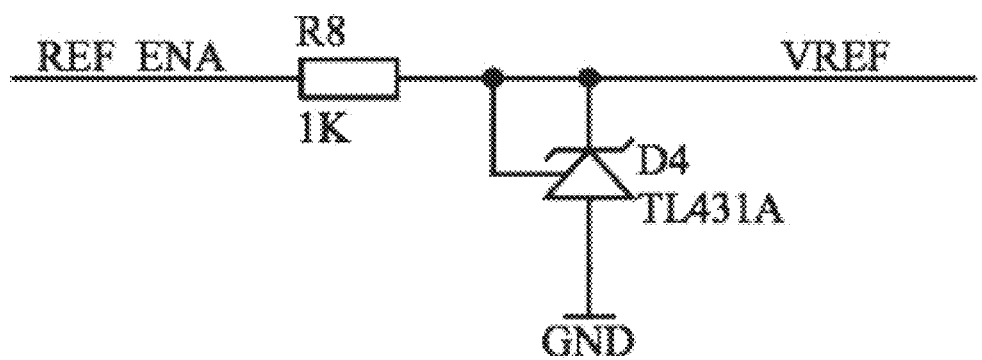

Nevertheless, the schematic diagram of the voltage regulation circuit (110) as shown in FIGS. 3(a)-(c) will now be discussed briefly.

As shown in FIG. 3(b), the voltage regulation circuit (110) comprises an electronic controller which can be a programmable controller, for example a microcontroller (U1), such as a PIC16F616 microcontroller, that is adapted to send and receive several input and output signals from the circuit of FIGS. 3(a) and (c). The microcontroller (U1) is operatively connected to the positive terminal, the negative terminal, the power source and to one or more of the other electronic components of the voltage regulation device in order to send and receive input and output signals and thereby to sense and regulate the output voltage in the programmed variable level.

In FIG. 3(a), a first component (P1) on the left represents the terminals (102 and 112) of the battery (100) that are adapted to connect a user's product/device (not shown) in order to supply power to the user's product/device. The first component (P1) is also adapted to connect to a battery charger (not shown) in order to charge a power source/internal cell (114) such as a Li-ion cell that is internal to the battery (100). There is a second component (P2) on the right that connects to the power source/internal cell (114) such as the Li-ion cell that is internal to the battery (100).

Capacitors (C1, C2, C3 and C4) and inductor (L1) are preferably positioned in the circuit as shown in the FIG. 2 (a). These components form a noise suppression circuit that is operatively connected to the microcontroller (U1) so that the microcontroller (U1) can receive at least one input signal from the noise suppression circuit. The noise suppression circuit provide for noise suppression, particularly spurious noise suppression. The voltage regulation circuit (110) comprises at least one regulator. The regulator(s) being operatively connected to the programmable controller (U1) and is adapted to be activated by the programmable controller (U) at a preset battery output level in order to regulate the output voltage. This will now be described in more detail.

A voltage boost regulator is formed by an N-channel MOSFET (Q2), resistors (R12, R4, R3, R14), diode (D2) and capacitor (C6). The voltage boost regulator is operatively connected to microcontroller (U1) and the microcontroller (U1) is adapted to receive at least one input signal from the voltage boost regulator to allow the voltage boost regulator to increase a voltage supplied from a battery charger to a higher voltage to charge the internal cell (114). The voltage boost regulator is adapted to increase the voltage from a first level supplied from an external battery charger (for example approximately 1.6V DC) to a second higher voltage that is needed for charging the internal cell (>3.5V DC). The voltage boost regulator is controlled by the first control signal (PWM1) which is a Pulse Width Modulation signal and provides its status to the micro-controller (U1) via a first current signal (CUR1).

Resistors (R6 and R15) and capacitor (C8) together define a first current sensing circuit configured to determine or sense: i) the current being drained by the user's product/device; and ii) the current being used by the internal cell (114) of the battery (100) during discharge. The first current sensing circuit provides its status to the micro-controller (U1) via a second current signal (CUR2).

A voltage buck regulator is formed by a P-channel MOSFET (Q1), diode (D1) and resistors (R2 and R16). The voltage buck regulator that is operatively connected to the microcontroller (U1) and the microcontroller (U1) is adapted to receive at least one input signal from the voltage buck regulator to allow the voltage buck regulator to convert a voltage supplied by the internal cell (110) to the output voltage of the battery (100). The voltage buck regulator is adapted to convert the voltage supplied by the Li-ion cell (3.7V DC) to the regulator battery output (up to 1.5V DC). A person skilled in the art will appreciate that the battery output voltage may vary depending on the current being used by the user's product/devices. Such variable regulation is controlled by the micro-controller (U1) via a second control signal, which is a Pulse Width Modulation signal (described in more detail below).

Resistors (R13 and R5) and capacitor (C7) together define a second current sensing circuit adapted to sense/detect: i) the current being drained from the Li-ion cell; and ii) the current being charged to the Li-ion cell and this circuit provides its status to the micro-controller (U1) via a third current signal (CUR3).

A circuit for regulating a voltage of the microcontroller (U1) is shown in the FIG. 3(c). This microcontroller voltage regulation circuit comprises resistor (R8) and diode (D4) and this circuit provides its status to the micro-controller (U1) via a voltage signal ($V_{REF}$).

As can be seen from FIG. 3(b), the micro-controller (U1) comprises resistor (R7) and capacitor (C5). FIG. 3(b), shows how the microcontroller (U1) receive several input signals from the circuits of FIGS. 3(a) and (c). As shown in FIG. 3(b), the microcontroller (U1) gets feedback from the current signals (CUR1, CUR2 and CUR 3) and first and second control signals (PWM1 and PWM2) of FIG. 3(a) to ensure correct output voltage of the battery (100) when in use and also to ensure correct charging of the internal cell (114) when the battery (100) is connected to the charger (not shown). When there is a predetermined current drain from the user's product/device that is sensed from the second current signal (CUR2), the output voltage of the battery is set via the second control signal (PWM2) at a programmed level between 1.2 V DC and 1.5V DC to ensure the best possible usability. This ability to control/regulate voltage at a programmed level between 1.2V and 1.5V DC is a highly advantageous feature of the present invention.

This is because if the output voltage was set to a fixed 1.5V DC, it may burn out some electronics. Similarly, if the output voltage is set at a lower voltage, the battery may not provide enough voltage for some electronics.

Therefore, by the use of advanced micro-electronics, a battery (100) with a regulated output voltage is achieved. The battery (100) using the voltage regulation circuit (110) as discussed above is able to output a high amount of power until it is fully discharged (or 'flat'). This is advantageous over previously known non rechargeable/single use batteries as well as all other NiMH/NiCD rechargeable batteries which slowly reduce the output voltage as they discharge (or 'go flat') thereby affecting how the user's product/device might work.

Also, the battery (100) using the voltage regulation circuit (110) as discussed above can provide a regulated voltage input which means that the battery (100) can be charged with all commercially available NiMH/NiCD battery chargers. This can be an additional advantage over previously known circuit regulated batteries that require special chargers. Alternatively, special chargers can be developed for the batteries if desired.

Figure 4:
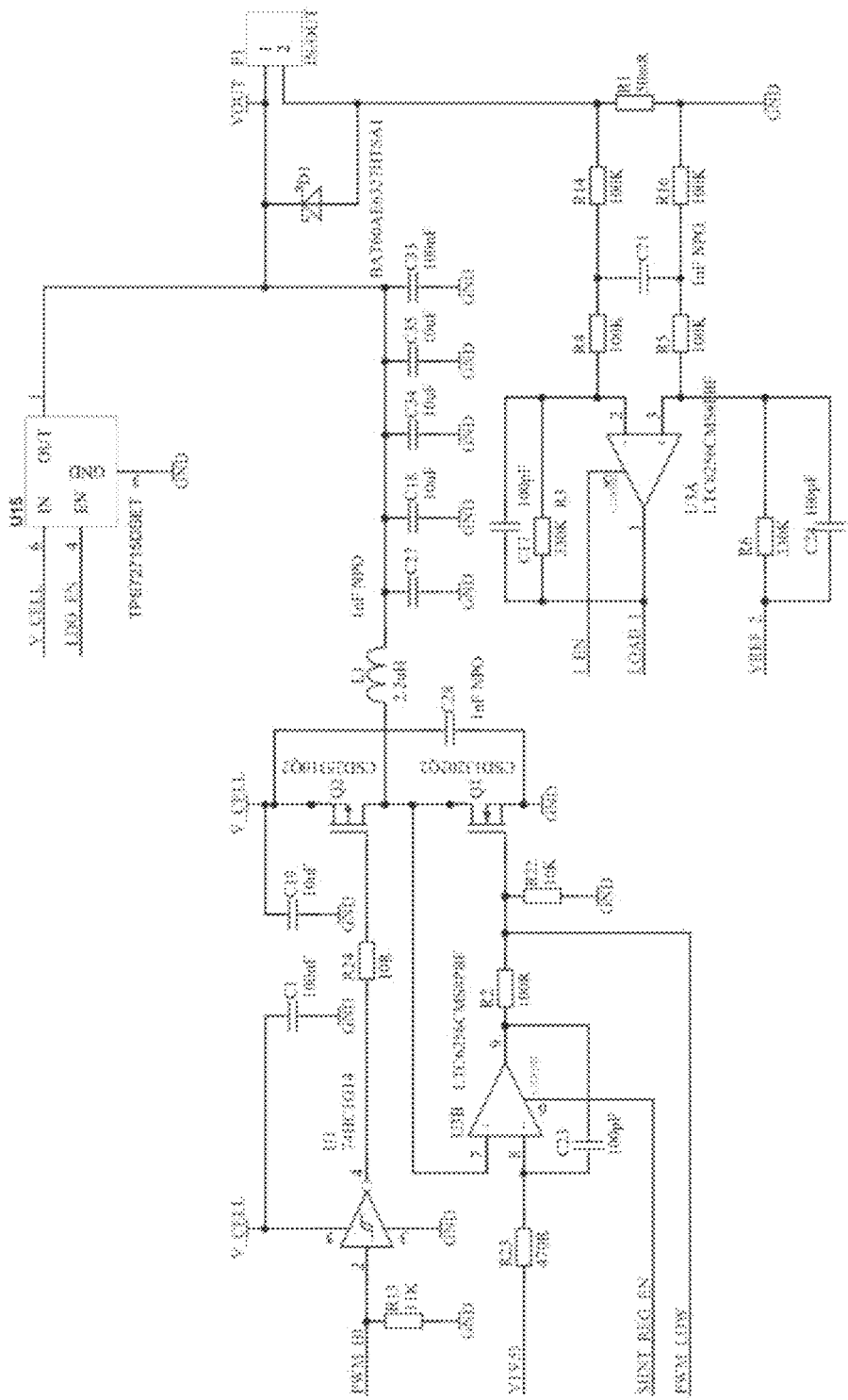
FIGS. 4(a)-(i) together show a schematic diagram of a second embodiment of a voltage regulation circuit to be used in the battery of FIGS. 1 and 2.
Figure 4:
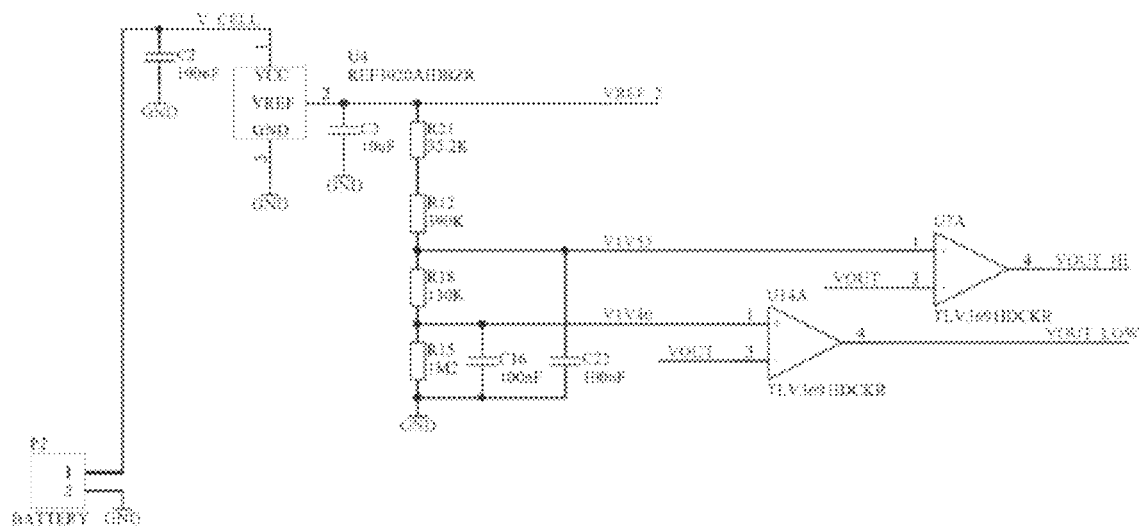
Figure 4:
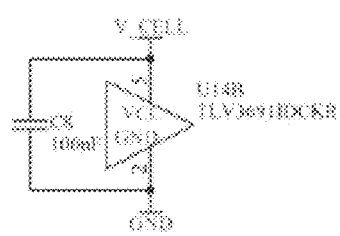
Figure 4:
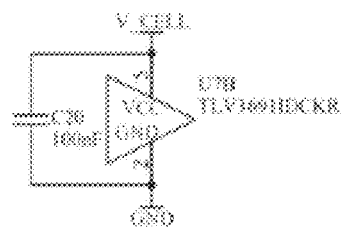
Figure 4:
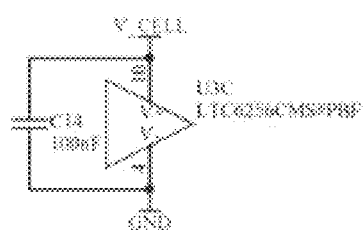
Figure 4:
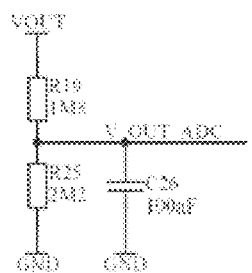
Figure 4:
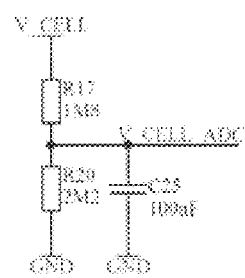
Figure 4:
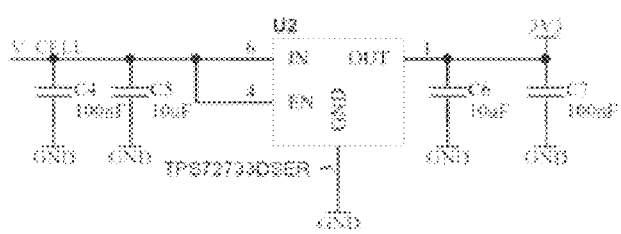
Figure 4:
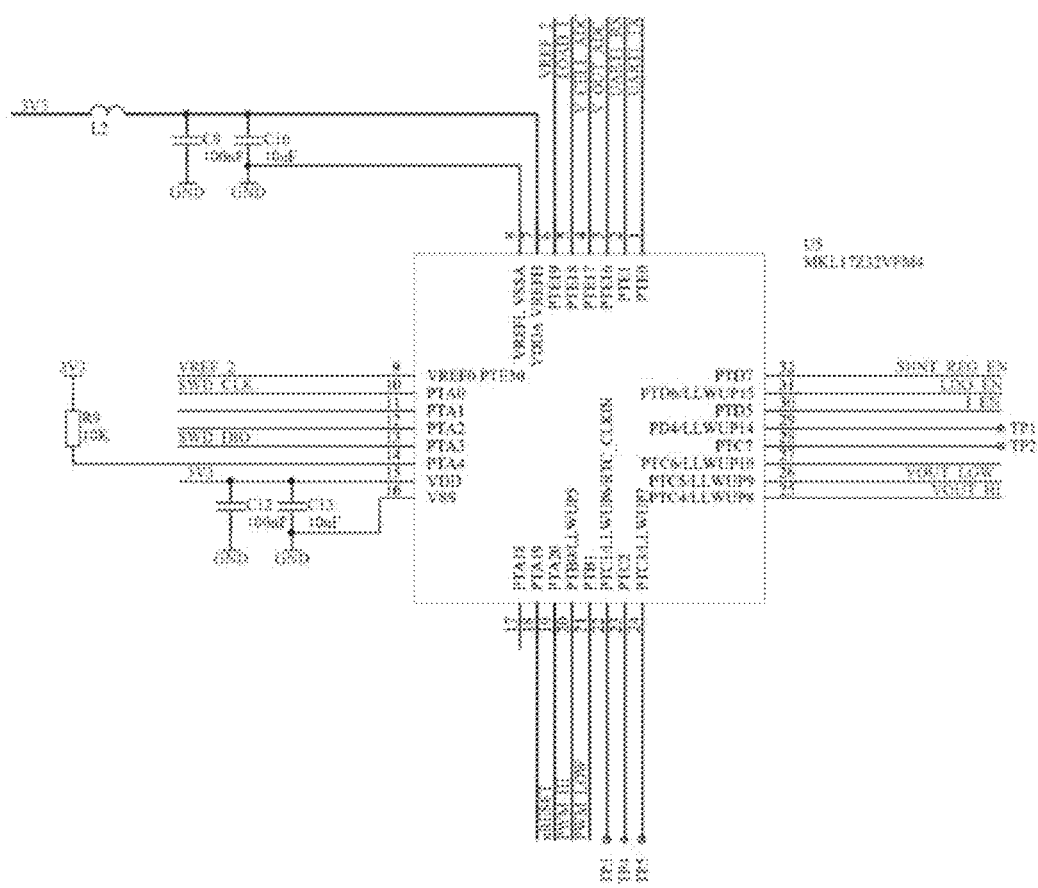

Second Preferred Embodiment of the Voltage Regulation Circuit (FIGS. 4 (a)-(i))

FIGS. 4 (a)-(i) together show a circuit diagram of an alternative form of the voltage regulation circuit (110) that is used in the battery (100) of the present invention. As it can be seen from FIGS. 4(a)-(i), the voltage regulation circuit (110) comprises several electronic components that are electronically and operatively connected to each other. The values and units of most of those electronic components are also shown in those figures. To a person skilled in the art, the arrangement and functionality of the voltage regulation circuit (110) will be self-explanatory upon consideration of the schematic diagrams of FIGS. 4(a)-(i) and therefore need not be discussed in detail. Nevertheless, the schematic diagram of the voltage regulation circuit (110) as shown in FIGS. 4 (a)-(i) will now be discussed briefly.

As shown in FIG. 4 (i), the voltage regulation circuit (110) of this second preferred embodiment comprises a microcontroller (U5) that is adapted to send and receive several input and output signals from the circuits of FIGS. 4(a) to (h).

In FIG. 4(a), a first component (P1) represents the terminals (102 and 112) of the battery (100) that is adapted to be connected to a user's product/device (not shown) in order to supply power to the user's product/device. The first component (P1) is also adapted to connect to a battery charger (not shown) in order to charge the power source i.e., internal cell (114) such as Li-ion cell that is internal to the battery (100).

FIG. 4(a) comprises Output Current Sensor. Low Dropout Linear Regulator (i.e. LDO Regulator) and Synchronous Buck Regulator/Voltage Boost and Pass through. These components will be discussed later in more detail.

FIG. 4 (b) contains a second component (P2) that connects to the internal cell (114) that is internal to the battery (110). The circuit of FIG. 4(b) is adapted to provide voltage references that are required by other circuit sections. In this example, a fixed voltage regulator outputs a 2.048 volts DC to VREF 2. This voltage is divided using resistors (R21, R12, R18 and R15) to provide voltage references of 1.55vDC and 1.4 vDC. These voltage references are used by at least one or more of the microcontroller (U5) of FIG. 4(i), the current sensor of FIG. 6 and the synchronous buck regulator/voltage booster of FIG. 8.

FIGS. 4 (c)-(e) show the power connections for integrated circuits U3, U7 and U14 respectively. They are powered directly from the second component (P2) via the power source V CELL.

FIG. 4 (f) is an example circuit for sensing the battery output voltage and is used as the Charger Sensor Circuit to detect an external charger. This circuit and its applications will be discussed later in more detail.

FIG. 4 (g) is an example circuit for sensing the voltage of the internal cell (114) and is used as the Internal Cell Voltage Sensor. This circuit and its applications will be discussed later in more detail.

FIG. 4 (h) is a fixed 3.3 V DC regulator to power the microcontroller (U5). 4 (i) shows how a programmable microcontroller (U5) receives several inputs from the circuits of FIGS. 4 (a) to 4 (h).

The voltage regulation circuit of this second embodiment can provide several key features including intelligent battery output; intelligent battery charging; voltage drop when the power source approaches the end of discharge and battery level indication.

These key features and how they are achieved will now be discussed in more detail with reference to the drawings.

Intelligent Battery Output

Intelligent battery output is one of the features of the battery (100) that may be achieved through the voltage regulation circuit (110) of the second embodiment.

With regular batteries (Alkaline 1.5 V disposable, Lithium 1.5V primary and MiMH 1.2 V rechargeable), under load the voltage drops slightly even when the batteries are new and fully charged. Some electronics is designed with this in mind such as many flashlights where bulbs are not rated at 1.5 V but are rated at a slightly lower voltage than 1.5V, mostly in the 1.2V to 1.4V range.

A fixed 1.5 V output will in some cases damage the electronics. Some flashlights will burn out the bulbs with a fixed 1.5 V battery/batteries.

In the present invention, the battery (100) is adapted to sense the output current and adjust the output voltage according to the output current. An example of a possible voltage drop for an AA battery is as per below.

TABLE 1

| Output Current mA | Output Voltage vDC |
|---|---|
| 0 | 1.50 |
| 50 | 1.49 |
| 100 | 1.48 |
| 150 | 1.47 |
| 200 | 1.46 |
| 250 | 1.45 |
| 300 | 1.44 |
| 400 | 1.43 |
| 600 | 1.42 |
| 800 | 1.41 |
| 1000 | 1.40 |
| 1100 | 1.39 |
| 1200 | 1.38 |
| 1300 | 1.37 |
| 1400 | 1.36 |
| 1500 or more | 1.35 |

The battery output current can be monitored by a number of methods. One method is to use a very low ohms value resistor on either the positive or the negative output, and measure the voltage across the resistor. As the current increases, the voltage across the resistor will increase. The feedback can then be used to adjust the voltage regulator and lower the output voltage.

An example of a circuit that will do this will now be discussed.

The voltage regulation circuit (110) comprises at least one regulator that is operatively connected to the programmable controller (U5) and is adapted to be activated by the programmable controller (U5) at a preset battery output level in order to regulate the output voltage. This will now be described in more detail.

Figure 5:
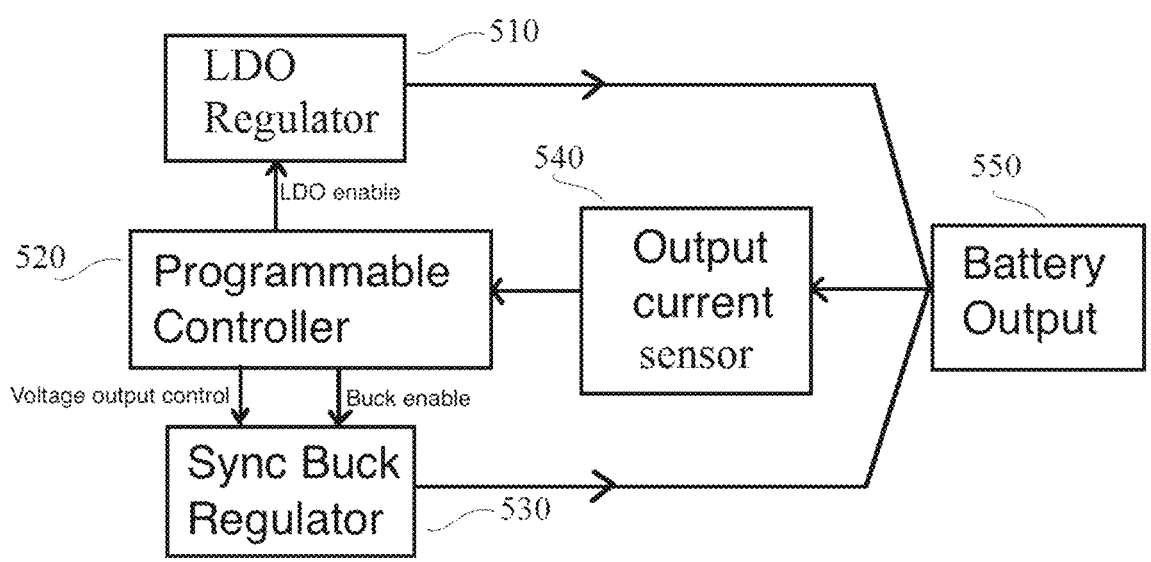
FIG. 5 is a block diagram showing an exemplary process to sense the output current and adjust the output voltage for a battery using a voltage regulation circuit of an embodiment of the invention.

The block diagram of FIG. 5 corresponds to the circuit of FIG. 4(a) that has both a LDO regulator (510) and a Voltage Buck Regulator, i.e. a Synchronous Buck Regulator (530). The LDO regulator (510) is included in this embodiment for battery efficiency at low currents. It is possible to have only one regulator or more than two regulators.

Referring to the block diagram of FIG. 5, when there is no current drain or a pre-determined low current drain-the programmable controller (520) which is same as the microcontroller (U5) of FIG. 4(i), activates the LDO regulator (510) to regulate the output voltage and disables the Synchronous Buck Regulator (530). The LDO Regulator (510) output is sensed for the current flow and provided as the battery output (550). An Output Current Sensor (540) is fed back to the programmable controller (520). If the output current exceeds a pre-determined current drain, the programmable controller (520) activates the Synchronous Buck Regulator (530) and disables the LDO regulator (510). In this example, for low current outputs, the LDO regulator (510) is more efficient and for medium to high current outputs, the Synchronous Buck Regulator (530) is more efficient.

Figure 6:
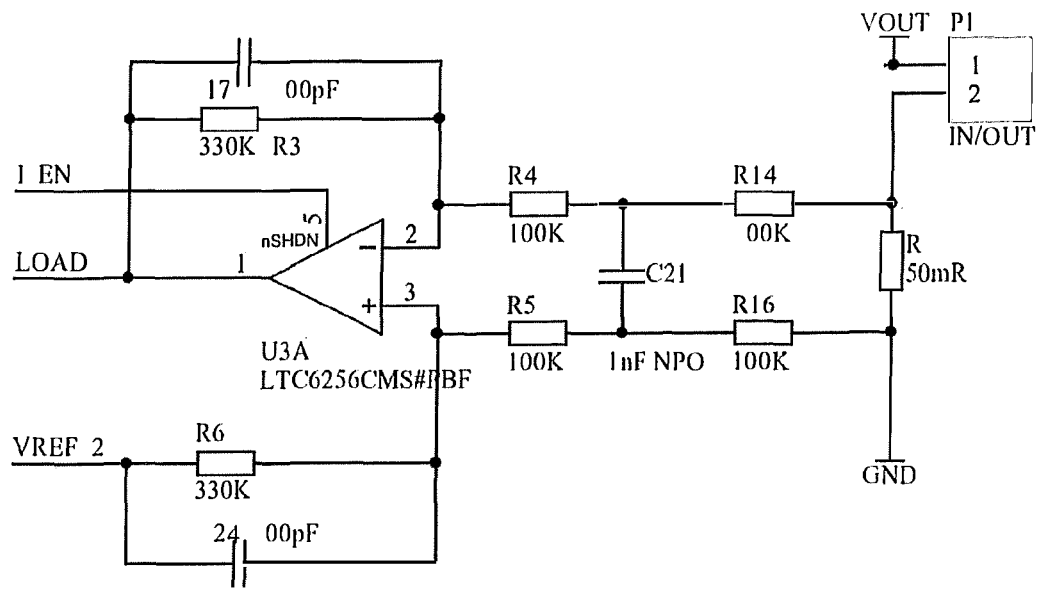
FIG. 6 is the schematic diagram of an exemplary output current sensor circuit that may be used in a voltage regulation circuit of the invention.

The circuit of FIG. 6 is an example of the Output Current Sensor (540) of FIG. 5 having the battery output (550) as P1. This circuit of the Output Current Sensor (540) of FIG. 6 can also be seen in FIG. 4(a). As it can be seen in FIG. 4(i), the signals "I EN", "LOAD 1" and "VREF 2" all connect to the microcontroller (U5).

The current is measured by measuring the voltage drop across resistor (R1) using an operational amplifier (U3A) with the resulting voltage being provided to microcontroller (U5) where programming determines the actual current value. The higher the current flow through resistor (R1), the higher the voltage difference across resistor (R1) (as per Ohm's Law Voltage (V)=Current (I)×Resistance (R)). In the circuit of FIG. 6, the operational amplifier (U3A) amplifies the voltage difference measured across resistor (R1) to provide greater measurement accuracy.

Figure 7:
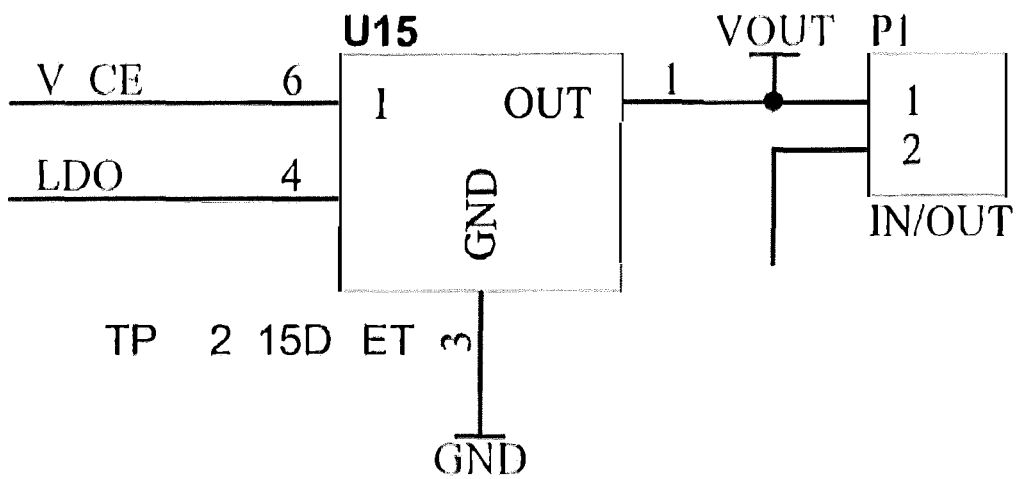
FIG. 7 is the schematic diagram of an exemplary Low Drop-out Linear (LDO) regulator circuit that may be used in an embodiment of the invention.

The circuit of FIG. 7 is an example of a circuit for the LDO Regulator (U15) which is the same as the LDO regulator (510) in the block diagram of FIG. 5. This circuit of FIG. 7 can also be seen in FIG. 4(a). The "V Cell" signal is connected to the internal cell (114), the "LDO EN" is connected to the microcontroller (15) and P1 is the battery output (550).

For low current drains, the LDO Regulator (U15) will act as a fixed voltage regulator to ensure maximum efficiency at low loads. The LDO regulator (U15) is enabled or disabled by the programmable controller (520), i.e. the microcontroller (U5). In the circuit of FIG. 7, the LDO regulator (U15) will be enabled, when the battery (100) has a low current drain and will be disabled when the battery (100) has a high current drain. During the high current drain, the Synchronous Buck Regulator (530) will take over. The LDO regulator (U15) in this example of FIG. 7 is a fixed voltage regulator. However, a person skilled in the art will appreciate that the invention will also work if the LDO regulator was a variable voltage regulator set for 1.5 V DC output.

Figure 8:
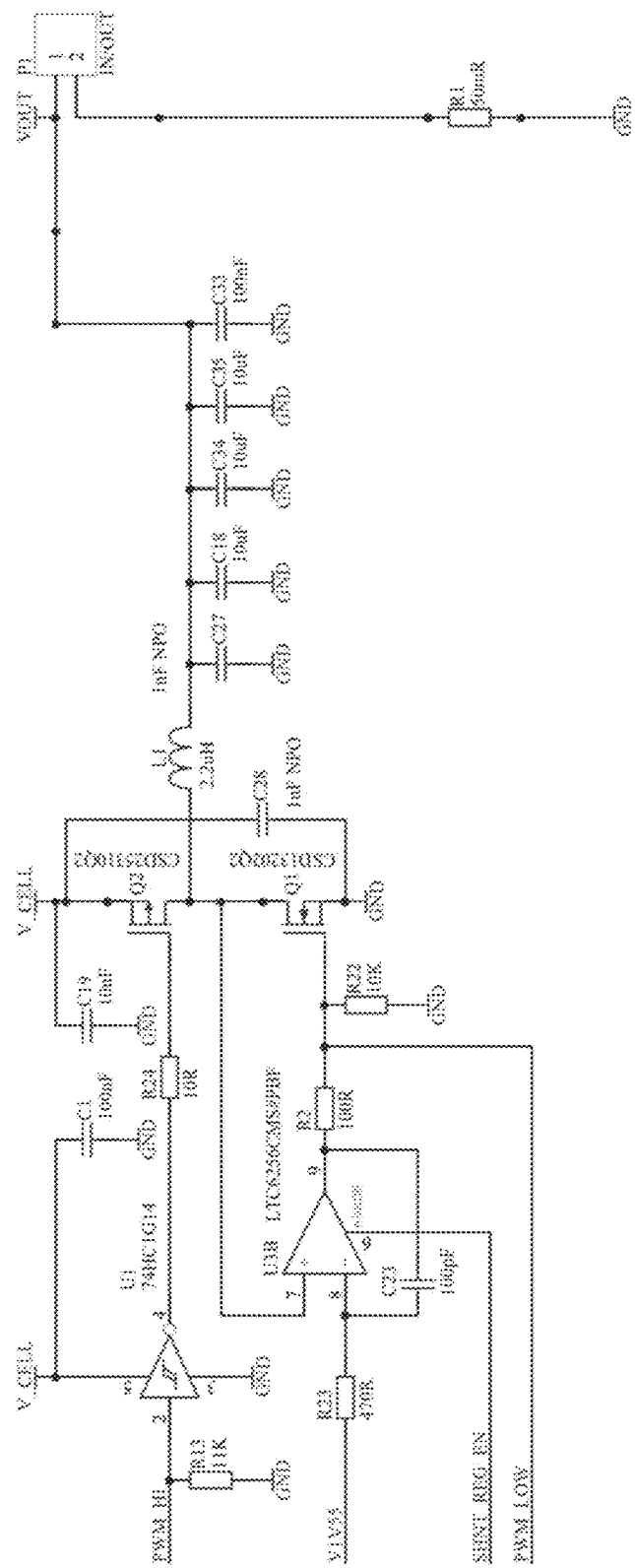
FIG. 8 is the schematic diagram of a Synchronous Buck Regulator circuit that may be used in an embodiment of the invention.

The circuit of FIG. 8 is an example of a Synchronous Buck Regulator (530) of FIG. 5. This circuit of FIG. 8 can also be seen in FIG. 4(a). The Synchronous Buck Regulator (530) will be activated by the microcontroller (U5) at a preset battery output current level. The "V Cell" signal is connected to the internal cell (114). The signals "PWM HI". "SHNT REG EN" and "PWM LOW" signals all connect to the microcontroller (U5) as shown in FIG. 4(i). The battery output is shown as P1. The signal "V1V55" is connected to a fixed 1.55 V DC reference.

For high current drains, the programming of the microcontroller (U5) will turn off the LDO Regulator (U15) and regulate the output using the Synchronous Buck Regulator (530). This is done by turning off the operational amplifier (U3B) and the microcontroller (U5) will control the output voltage via the operational amplifier (U1), N channel MOSFET (Q1), P channel MOSFET (Q2) and inductor (L1).

The output voltage is the input voltage times the duty cycle and hence lowering the duty cycle allows the reduction of the output voltage. Programming of the microcontroller controls the duty cycle.

$$V\_Out = V\_in * Duty$$

$$Duty = Q1 \text{ (On Time)}/Q1 \text{ (Off Time)} + Q1 \text{ (On Time)})$$

e.g. $V\_In = 3.5V$, On time=420 ns, Off time=580 ns $$Duty = 420e-9/420e-9+580e-9) = 0.42$$

$$V\_Out = 3.5 * 0.42 = 1.47 \text{ V}$$

Although the embodiment discussed above uses two regulators for efficiency purpose, it is possible to have only one regulator or more than two regulators.

Figure 9:
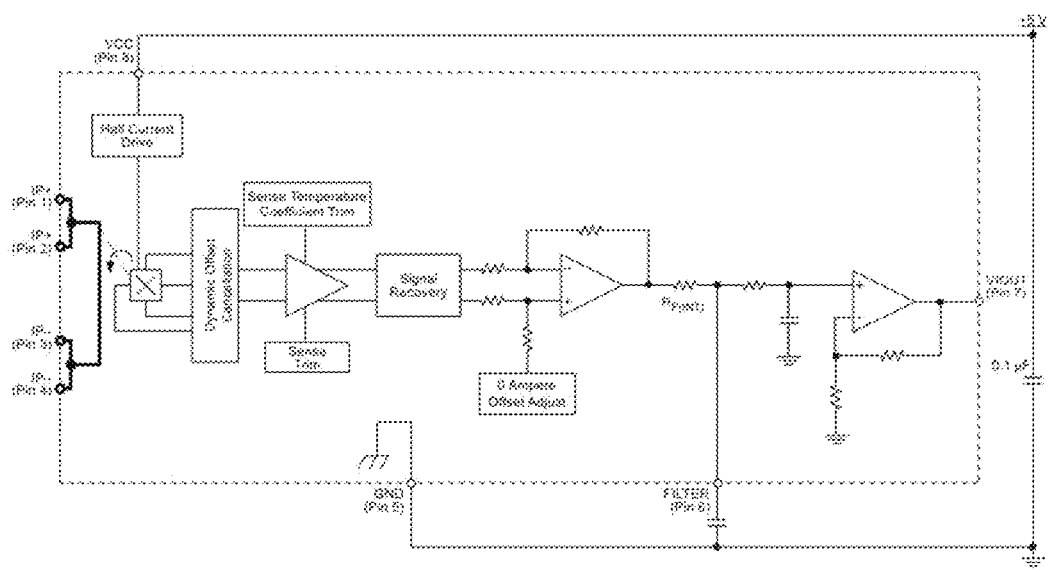
FIG. 9 is the schematic diagram of an alternative form of an output current sensor circuit that may be used in a voltage regulation circuit of the invention.

FIG. 9 shows an alternative form of the output current sensor (540) to measure the battery output current. The circuit of FIG. 9 uses a Hall Effect Sensor (represented by X in FIG. 9) to measure the magnetic field through a conductor that carries a current which eliminates the need for the resistor (R1). The magnetic field strength around the conductor is proportional to the current flow through it. As the current increases, the magnetic field strength increases. The current flows from IP+ to IP−.

Intelligent Battery Charging

Intelligent battery charging is another feature that can be achieved from the second preferred embodiment of the voltage regulation circuit (110).

Existing Hybrid (power source and electronics) batteries in the AAA, AA, C and D format require special chargers or are charged by non-standard methods such as USB.

The battery (100) of the present invention uses electronic circuitry to sense a voltage from the battery charger, such as a standard NiMH or Li-ion battery charger and regulates this voltage to charge the internal cell (114).

An example of a circuit that will do this will now be described.

Figure 10:
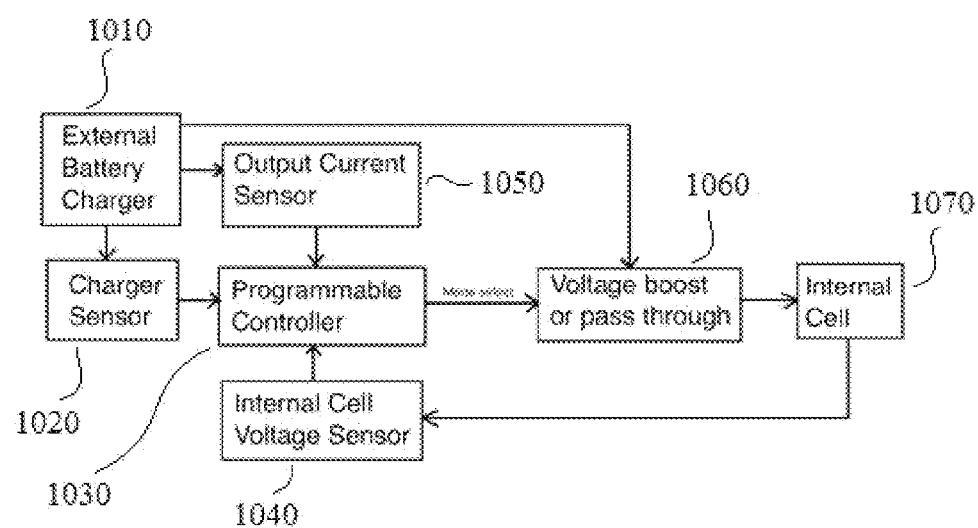
FIG. 10 is a block diagram showing an exemplary process for intelligent battery charging using a voltage regulation circuit of the invention.

Turning now to the block diagram of FIG. 10, the voltage regulation circuit comprises at least one charger sensor (1020) that is operatively connected to the programmable controller (1030) which is same as the microcontroller (U5) and is adapted to determine a connection to an external battery charger (1010) by detecting a voltage from the external battery charger (1010).

The charger sensor(s) (1020) may be adapted to detect a voltage of the external battery charger (1010) as a voltage level information and feed that voltage level information to the microcontroller (U5) in order to regulate the detected voltage of the battery charger (1010) for charging the internal cell (1070) (which is same as internal cell (114)).

The charger sensor(s) (1020) may also be adapted to detect a voltage level information from an external battery charger (1010) and feed the voltage level information to the microcontroller (U5) in order to regulate the output voltage according to the output current at the programmed variable level.

Referring again to FIG. 10, when the battery (100) is connected to the external battery charger (1010), the charger sensor (1020) detects the voltage from the external battery charger (1010) and sends a signal to a programmable controller (1030) which is the same as the microcontroller (U5) of FIG. 4 (i). The signal provides information to the programmable controller (1030) regarding the type of external battery charger (1010) that is connected. If the connected external battery charger (1010) is a first power source type of battery charger (e.g. a Li-ion charger) and the internal cell (1070) (which is same as internal cell (114) of FIGS. 1 and 2) is also of the same first power source type (e.g. a Li-ion cell), the programmable controller/microcontroller (1030, U5) will activate a pass through to effectively directly connect the charger to the internal cell (1070). If the connected external battery charger (1010) is a second power source type of battery charger (e.g. a NiMH battery charger) and the internal cell of the battery is of a different power source type (e.g. Li-ion cell), the programmable controller/microcontroller (1030, U5) will activate a Voltage Boost or Pass through circuit (1060) to adjust the charge voltage to enable charging of the different power source (e.g. increase the lower NiMH charge voltage up to the higher Li-ion charge voltage).

The circuit of FIG. 4(f) is an example of the Charge Sensor (1020). The "VOUT" signal connects to the external battery charger (1010) and as shown in FIG. 4(i), the "V OUT ADC" signal connects to the microcontroller (U5).

The Voltage Boost or Pass through Circuit (1060) of this embodiment is the same circuit as the Synchronous Buck Regulator (530) as described above with reference to FIG. 8, which also appears in FIG. 4 (a). The "V CELL" signal is connected to the internal cell (1070). The "PWM HI", SHNT REG EN" and PWM LOW" signals all connect to the microcontroller (U5). P1 is the battery output. The "V1V55" is connected to fixed 1.55V DC reference. The "VOUT" signal is connected to the external battery charger (1010).

For example, a Li-ion charger will output a higher voltage than a NiMH charger and the programming of the microcontroller (U5) determines which type of external battery charger (1010) is connected. The microcontroller (U5) may then determine if the voltage needs to be adjusted to allow charging of the specific type of power source being used by the battery and controls the voltage regulation circuit to provide the required voltage level for charging the specific power source.

Turning again to FIGS. 4(a) and (i), if the microcontroller (U5) determines that a Li-ion charger is connected and the internal cell (114) is Li-ion, an output if the microcontroller (U5) will fully switch on P Channel MOSFET (Q2) and switch off N Channel MOSFET (Q1). The Li-ion charger is then connected to the internal cell (1070 via inductor (L1) and P Channel MOSFET (Q2) which are both effectively short circuit. The battery charger will act/charge like a Li-ion battery has been inserted.

If the microcontroller (U5) determines that a NiMH charger is connected and the internal cell (1170) is Li-ion, N Channel MOSFET is used to create a voltage booster from the signal "VOUT" (battery terminals and battery charger) side to the "VCEL" signal (internal cell (1170)). The inductor (L1) is used as a boost indicator so when the N Channel MOSFET (Q1) is on, current flows into inductor (L1) from the charge source.

When N Channel MOSFET (Q1) is off the current flows through P Channel MOSFET (Q2) into "VCELL" and the input capacitors (C18, C34 and C35) hold the source end of the inductor at a constant voltage while it is discharging through P Channel MOSFET (Q2).

The circuit for the Output Current Sensor (1050) here is the same circuit as the Output Current Sensor (540) described above with reference to FIGS. 5 and 6, which also appears in FIG. 4(a). Battery output and connection to the external battery charger (1010) is shown as P1 in FIG. 6. The signals "I EN", LOAD1" and VREF 2" all connect to the microcontroller (U5) as shown in FIG. 4(i).

The current is measured by measuring the voltage drop across resistor (R1) using an operational amplifier (U3A)

with the resulting voltage being provided to microcontroller U5 where programming determines the actual current value. The higher the current flow through R1, the higher the voltage difference across resistor (R1) (as per Ohm's Law Voltage (V)=Current (I)×Resistance (R)). In the circuit of FIG. 6, the operational amplifier (U3A) amplifies the voltage difference measured across resistor (R1) to provide greater measurement accuracy.

When the internal cell (1070) is fully charged the controller is able to sense the lower current being drawn by the internal cell (1070) via the resistor (R1) and operational amplifier (U3A) and at this point the microcontroller (U5) turns on P Channel MOSFET (Q2) (the P Channel MOSFET (Q2) acts as a shunt regulator) to bypass the charge source or to indicate to the charge source that the internal cell (1070) is fully charged.

The circuit of FIG. 4(*g*) is an example of the voltage sensor. i.e., an Internal Cell Voltage Sensor (1040). The signal "V-CELL" connects to the internal cell (1070) and the signal "VOUT ADC" connects to the programmable controller (1030), i.e. the microcontroller (U5).

The voltage level of the internal power source. i.e. the internal cell (1070) is sensed via resistors (R17 and R20) and that voltage is fed to the microcontroller (U5).

Although, this description of the preferred embodiment above refers to NiMI Ior Li-ion battery charger, a skilled person will appreciate that any type of battery charger could be used by modifying the Charge Sensor and Voltage Boost or pass through circuits.

Figure 12:
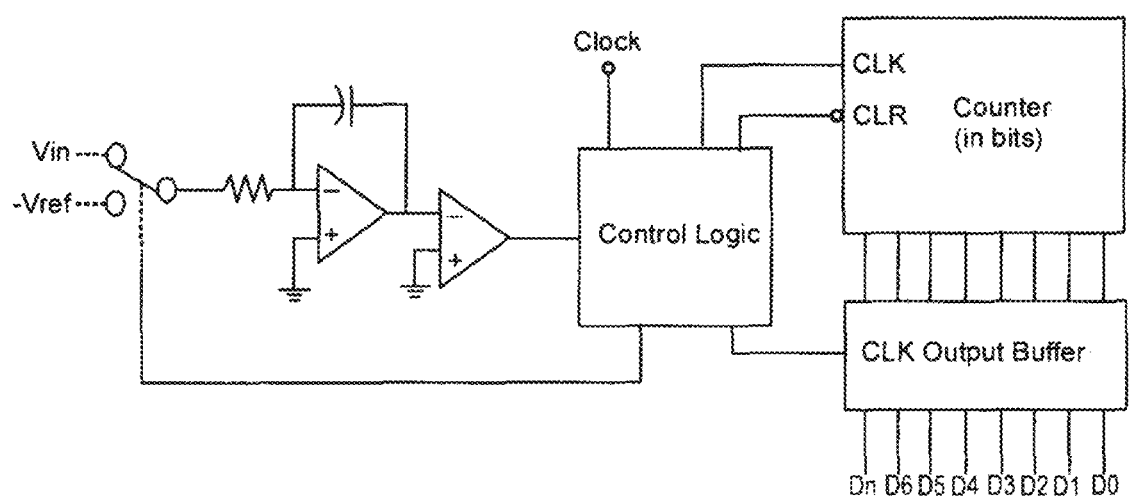
FIG. 12 is an example of a Dual Slope ADC circuit for charging the internal cell that is suitable to be used in a voltage regulation circuit of the invention.

The external battery charger can also be detected using other type of comparators such as a flash convertor or multi comparators (see FIG. 1I) or Dual Slope ADC (see FIG. 12).

The internal cell (1070) can also be charged from an external battery charger (such as a NiMH charger) using other circuit designs such as via a transformer based converter such as a fly-back transformer.

Figure 13:
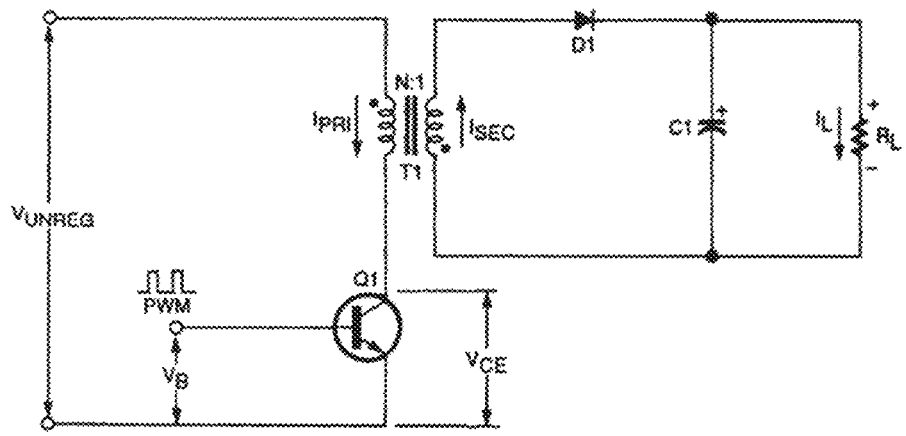
FIG. 13 is an example of a transformer based circuit for charging the internal cell that is suitable to be used in a voltage regulation circuit of the invention.

An example of a transformer based circuit is shown in FIG. 13.

Figure 14:
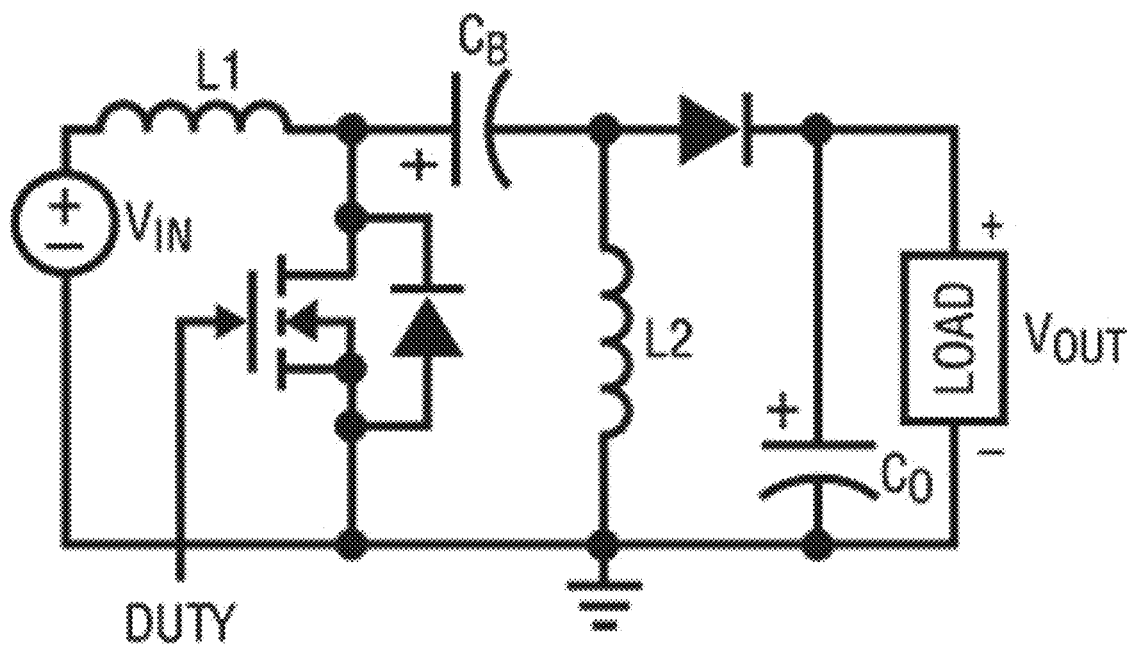
FIG. 14 is an example of a Single-Ended Primary Inductor Convertor circuit for charging the internal cell that is suitable to be used in a voltage regulation circuit of the invention.

The internal cell can also be charged from an external battery charger using other circuit designs such as Single-Ended Primary Inductor Convertor (SEPIC) or a 'CUK convertor. These convertors will boost the battery charger voltage to enable an internal cell with a higher or same voltage as the charger to be charged. An example of a SEPIC and/or 'CUK circuit is shown in FIG. 14.

Voltage Drop when the Power Source Approaches the End of Discharge

This is another feature provided by the second embodiment of the voltage regulation circuit (110).

With regular batteries (Alkaline 1.5V disposable, Lithium 1.5V primary and NiMH 1.2 V rechargeable), as they go flat (discharge) the voltage slowly drops. This can be seen in flashlights when they go dim with use or with motorized devices such as toys and electric toothbrushes when they slow down. Existing hybrid (power source and electronic) batteries have a fixed voltage output and when the internal power goes flat, the battery output simply turns off. This is not always desirable. For example, a user may find it undesirable if he/she is using a flashlight that is fully bright but then all of a sudden it turns off without warning.

The battery of this form of the present invention can monitor the internal power source and when it approaches the end of the discharge (i.e. it is almost flat), the battery voltage will be reduced to indicate to the user that it requires a recharge.

The battery of this form of the present invention can reduce the output voltage regardless of the output current. This means that if the output current is high and if the battery output is reduced, a further reduction is still applied. An example of a possible voltage drop for an AA battery according to the present invention is as per below.

TABLE 2

| Power source % used | Output Voltage drop (vDC) |
|---|---|
| 85 | 0.05 |
| 86 | 0.06 |
| 87 | 0.07 |
| 88 | 0.08 |
| 89 | 0.09 |
| 90 | 0.1 |
| 91 | 0.15 |
| 92 | 0.2 |
| 93 | 0.25 |
| 94 | 0.3 |
| 95 | 0.35 |
| 96 | 0.4 |
| 97 | 0.45 |
| 98 | 0.5 |
| 99 | Output reduced to zero |

An example of a circuit that will do this will now be described.

Figure 15:
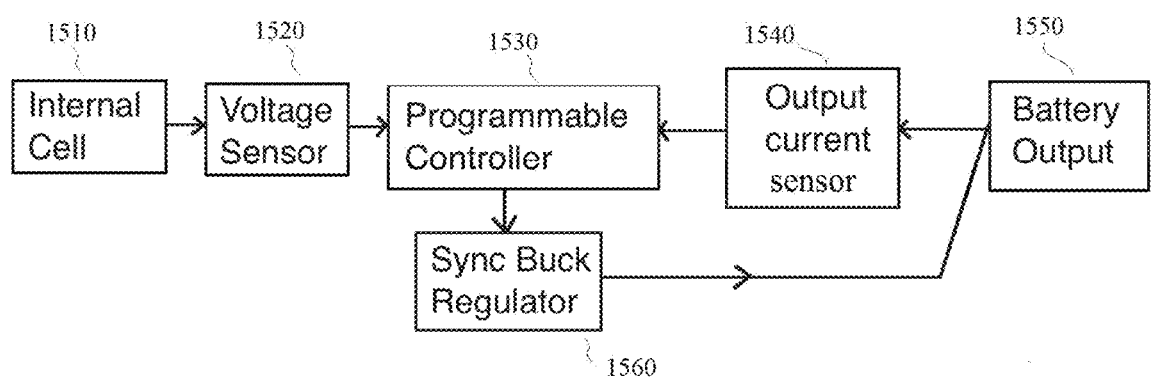
FIG. 15 is a block diagram showing an exemplary process for monitoring the internal power source/internal cell and for reducing the voltage as the power source approaches the end of discharge using a voltage regulation circuit of the invention.

Turning now to the block diagram of FIG. 15, the voltage of the internal cell (1510) (which is same as internal cell (114) of FIGS. 1 and 2) is sensed by the voltage sensor (1520) and this information (the internal cell voltage) is fed to the programmable controller (1530), which is same as the microcontroller (U5) of FIG. 4 (*i*). If the voltage of the internal cell (1510) has dropped to a pre-determined level that is pre-programmed into the microcontroller (U), the microcontroller (U5) will lower the output of the Synchronous Buck Regulator (1560) which will provide a lower battery output voltage.

If used with an output current sense/output current sensor (1540) that lowers the Battery output (1550) voltage when under load, the voltage drop programmed for the low internal cell (1510) could be added to the voltage drop programmed as part of the "Intelligent Output".

Although, FIG. 15 shows use of the output current sensor (1540), that is optional. The circuit of FIG. 4(*g*) is an example of the voltage sensor (an Internal Cell Voltage Sensor). The "VCELL" signal connects to the internal cell (1510) and the "V OUT ADC" signal connects to the microcontroller (U5).

The internal power source or the internal cell (1510) voltage level is sensed via resistors (R17 and R20) and this voltage is fed to the microcontroller (U5) in the same way as described above in the Intelligent Battery Output section.

The circuit for the Synchronous Buck Regulator (1560) here is the same circuit as the circuit of FIG. 8 that also appears in FIG. 4(*a*).

Turning back to FIG. 8, the "V CELL" signal is connected to the internal cell. The "PWM HI", SHNT REG EN" and "PWM LOW" signals all connect to the microcontroller (U5). P1 is the Battery Output. The "V1V55" signal is connected to a fixed 1.55V DC reference. The "VOUT" signal is connected to the battery output terminals.

The circuit of FIG. 4(*a*) will more effectively reduce the output voltage while the battery is under load and the Synchronous Buck Regulator (1560) circuit is being used rather than the LDO regulator (U15). To enable a voltage drop with a low current drain, the LDO regulator (U15) can be replaced with a variable LDO regulator rather than a fixed output regulator that is shown in the circuit diagram of FIG. 4(*a*).

The programming of the microcontroller (U5) would lower the output voltage as it regulates the output using a synchronous buck regulator (1560).

The voltage is dropped (regulated) by turning the operational amplifier (U3B) off and the microcontroller (U5) would control the voltage via operational amplifier (U1), N Channel MOSFET (Q1), P Channel MOSFET (Q2) and inductor (L1).

The output voltage is the input voltage times the duty cycle and hence lowering the duty cycle allows the reduction of the output voltage. Programming of the microcontroller controls the duty cycle.

Figure 11:
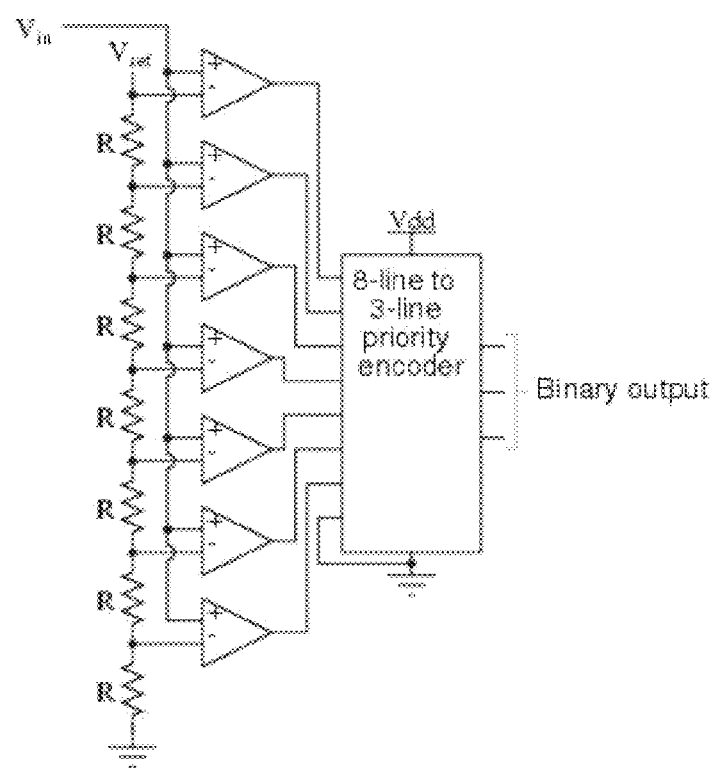
FIG. 11 is an example of a comparator circuit for detecting a battery charger that is suitable to be used together with the second embodiment of the voltage regulation circuit.

$V\_Out = V\_in * Duty$ $Duty = Q1\ (On\ Time)/Q1\ (Off\ Time) + Q1\ (On\ Time))$ e.g. $V\_In = 3.5V$, On time=420 ns, Offtime=580 ns $Duty = 420e-9/420e-9+580e-9) = 0.42$ $V\_Out = 3.5 * 0.42 = 1.47\ V$ The internal cell voltage can also be measured using other type of comparators such as a flash convertor or multi comparators (see FIG. 11) or Dual Slope ADC (see FIG. 12).

The above explained feature(s) of Voltage drop when the power source approaches the end of discharge may equally be applied to the battery (100) that uses the voltage regulation circuit (110) as described in the first embodiment of the invention.

Battery Level Indication

This is another feature provided by the second embodiment of the voltage regulation circuit (110).

The battery (100) of the present invention can include on a battery surface any form of indicators that is adapted to indicate or show the charge or power level of the battery. A voltage level indicator such as a voltage level meter showing the user how much power is left in the battery may be used.

With regular batteries (Alkaline 1.5V disposable, Lithium 1.5V primary and NiMH 1.2v rechargeable) as they go flat the voltage slowly drops. The battery user can measure the voltage with a multi-meter to see how much power if left in the battery. Some disposable batteries have voltage level indicator on the side of the battery. Existing rechargeable batteries however do not have any voltage level indicator.

Existing Hybrid (power source and electronic) batteries do not have any voltage indicators and the output is always 1.5 V regardless of the power left in the power source, i.e. internal cell (114).

If this internal cell (114) is Li-ion, an example if the battery voltage to measure is as follows:

Fully charged=over 4V
25% discharged=3.9V
50% discharged=3.8V
75% discharged=3.7V
Flat=3V or lower The internal cell (114) voltage can be measured by various methods. One way through the circuit of FIG. 4(g). The voltage of the internal cell (114) such as a Li-ion cell is directly measured via resistors (R17 and R20) and fed to microcontroller (U5) where the level of power left can be calculated by the programming of the microcontroller (U5).

In order to indicate the internal cell (114) voltage, a thermochromic ink covered conductive strip can be installed on the surface if the battery (100) under a clear film or clear section of the label and when one or both ends are pressed, a circuit is completed and the voltage applied to each end of the conductive film. The thermochromic ink would change colour as it indicates the temperature of the conductive film that would be proportional to the current flowing through the film. A single thermochromic ink or multiple inks could be used.

By using a current limit circuit that is programmed based on the voltage measured of the internal cell (114), a significant current range would be achieved thereby making the indication more accurate.

Figure 16:
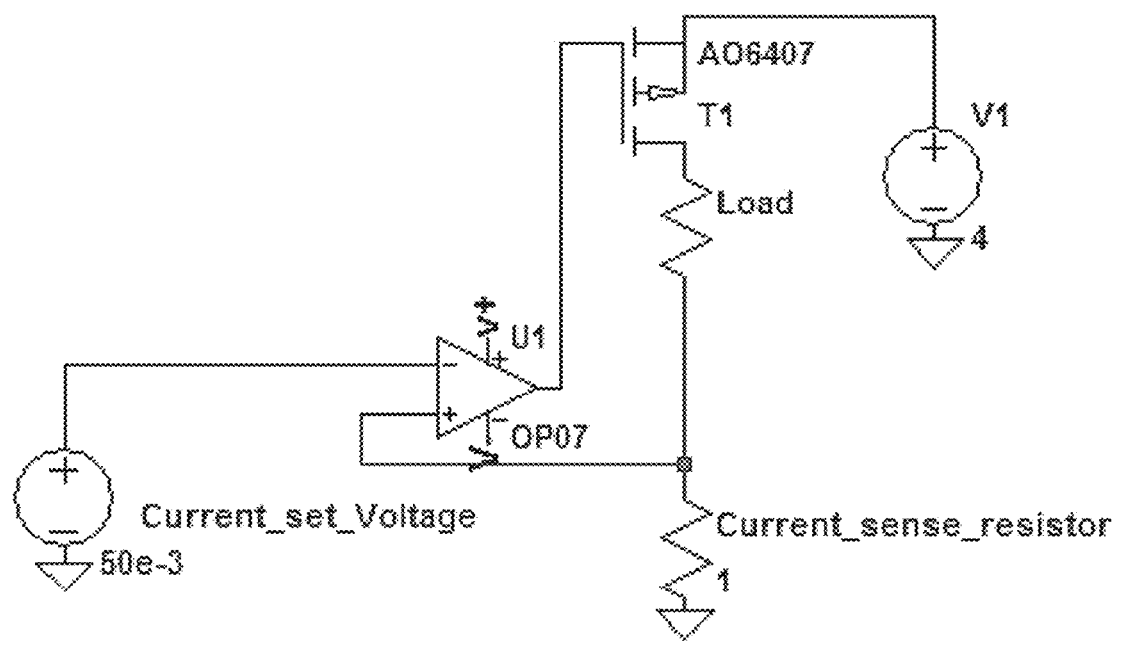
FIG. 16 is an example of a current limiting circuit for determining a battery voltage level that is suitable to be used in a voltage regulation circuit of the invention.

For example,
Fully charged=over 4V=50 mA
25% discharged=3.9V=40 mA
50% discharged=3.8V=30 mA
75% discharged=3.7V=20 mA
Flat=3V or lower=0 mA An example of a current limit circuit is shown in FIG. 16.

Constant current circuit-current=50 mA. The load is driven with a constant current.

Other ways of measuring include using comparators such as a single or multi slope comparators or a flash convertor.

The level of power left in the internal cell (114) can be shown using various methods.

Figure 17:
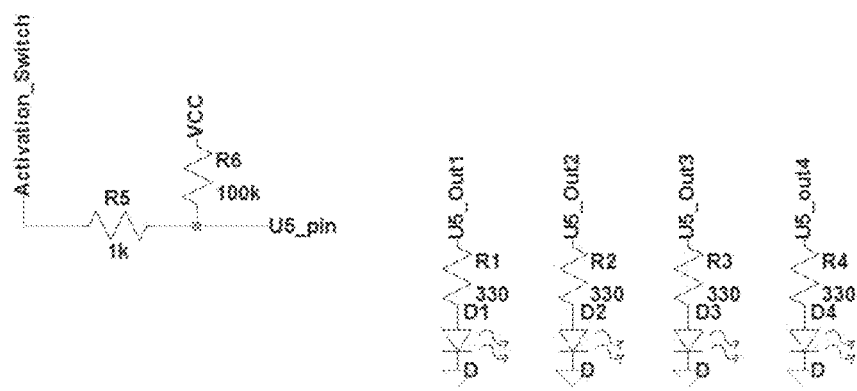
FIG. 17 is an example of a circuit for determining a battery voltage level to show voltage level that is suitable to be used in a voltage regulation circuit of the invention.

Another way is to use small LED's built in to the battery case that are programmed by the microcontroller (U5) to show the voltage level. The LED's could be ultra-low current and remain on at all times or they could be activated on a section of the battery to complete a circuit. This could be done using a conductive film under the battery label. An example of a circuit to show voltage level is shown in FIG. 17.

The above explained feature(s) of Battery level indication may equally be applied to the battery (100) that uses the voltage regulation circuit (110) as described in the first embodiment of the invention.

Although the embodiments for the intelligent battery output and the voltage drop when the power source approaches the end of discharge are described in relation to a rechargeable battery, it would be clear to a person skilled in the art that these voltage regulation circuits may equally be used to control the voltage output in a non-rechargeable battery. Similarly, the battery level indication may also be used for a non-rechargeable battery.

Comparison with Other Batteries Table 3 below shows how the battery of the present invention compares with previously known batteries when applied in different products:

TABLE 3

| Product | Alkaline | Lithium | NiMH | Present invention |
|---|---|---|---|---|
| Bluetooth speaker | Satisfactory | Excellent | Satisfactory | Excellent |
| Torch (incandescent) | Poor | Excellent | Satisfactory | Excellent |
| Torch (LED) | Poor | Excellent | Satisfactory | Excellent |
| Remote control car | Poor | Excellent | Satisfactory | Excellent |
| Walkie talkie | Poor | Excellent | Satisfactory | Excellent |
| Wii game controller | Satisfactory | Excellent | Satisfactory | Excellent |
| TV remote control | Excellent | Excellent | Satisfactory | Satisfactory |
| Wall clock | Excellent | Excellent | Satisfactory | Satisfactory |
| Wireless mouse/ keyboard | Satisfactory | Good | Satisfactory | Excellent |

TABLE 3-continued

| Product | Alkaline | Lithium | NiMH | Present invention |
|---|---|---|---|---|
| Camera flash unit | Poor | Poor to Good | Satisfactory | Excellent |
| Stored 3 months | Excellent | Excellent | Good | Excellent |
| Stored 6 months | Excellent | Excellent | Good | Good |
| Stored 12 months | Excellent | Excellent | Good/Satisfactory | Satisfactory |

Figure 18:
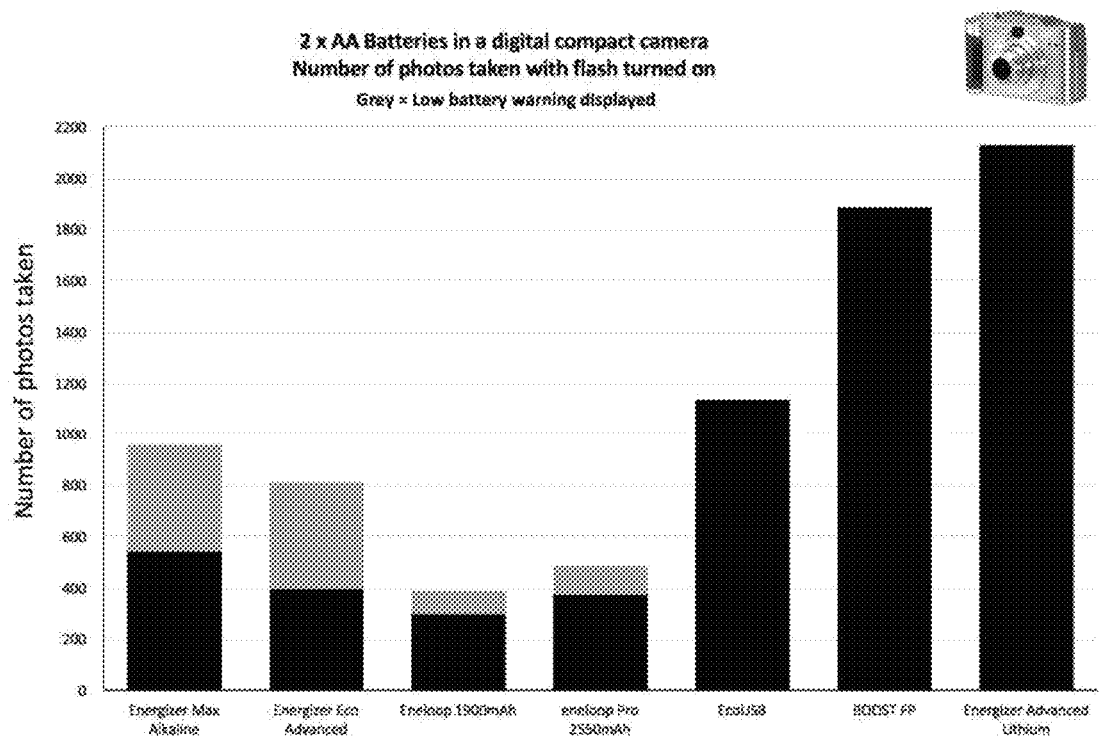
FIG. 18 is a bar graph showing data for several types of AA batteries when tested in a digital compact camera.

FIG. 18 is a graph showing actual data for several types of AA batteries when tested in a digital compact camera. The results in the graph are from tests carried out with 2×AA batteries in a digital compact camera until the camera would no longer take photos with the flash turned on.

The dark section of the bar graph shows the number of photos with the flash that were taken prior to the low battery being displayed. When the low battery level was reached, the camera went into a power saving mode and the display turned off between photos when the flash was recharging. The recharge time was also longer. The lighter section of the bar graph shows the number of photos taken when the low battery level was on.

The battery of the present invention (referred to as 'BOOST FP') was ready to take photos quickly for all photos. BOOST FP tested to be long lasting, fast flash recharge time and capable of taking more photos between recharges than any other rechargeable battery.

Figure 19:
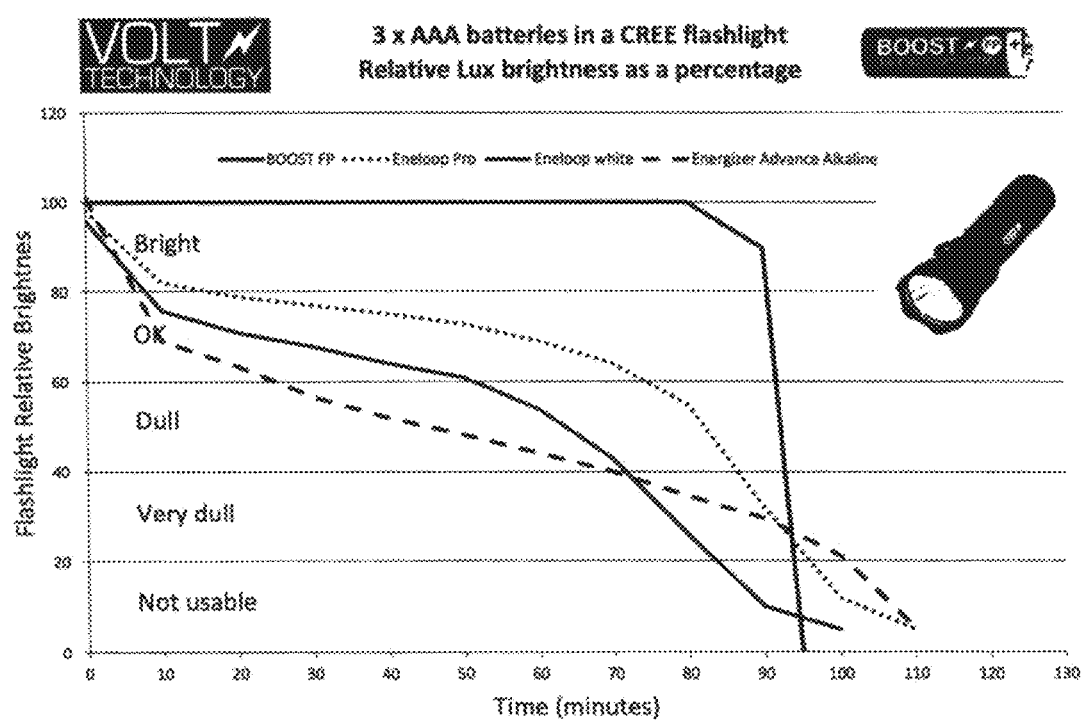
FIG. 19 is an exemplary graph showing actual for several types of AAA batteries when tested in a CREE LED flashlight.

FIG. 19 is the graph showing data for several types of AAA batteries when tested in a CREE LED flashlight. Specifically, the results in the graph are from tests carried out with 3×AAA batteries in a CREE LED flashlight.

The brightness was measured by a Lux meter and the battery of the present invention (referred to as 'BOOST FP') brightness was taken as the 100% baseline. Subsequent readings were taken as a percentage of this baseline.

The left side of the graph shows the brightness when first turned on. As time progressed, the brightness of the flashlight reduced while the batteries slowly started discharging (or 'got flatter').

The other batteries dropped their output very quickly resulting in a much dimmer flashlight output after a very short time (e.g. within a few minutes, such as 1-15, or 2-10 minutes). The graph of FIG. 19 shows the relative brightness overtime for a CREE LED flashlight with AAA batteries, clearly showing that no other battery tested provided full brightness as long as the BOOST FP.

Figure 20:
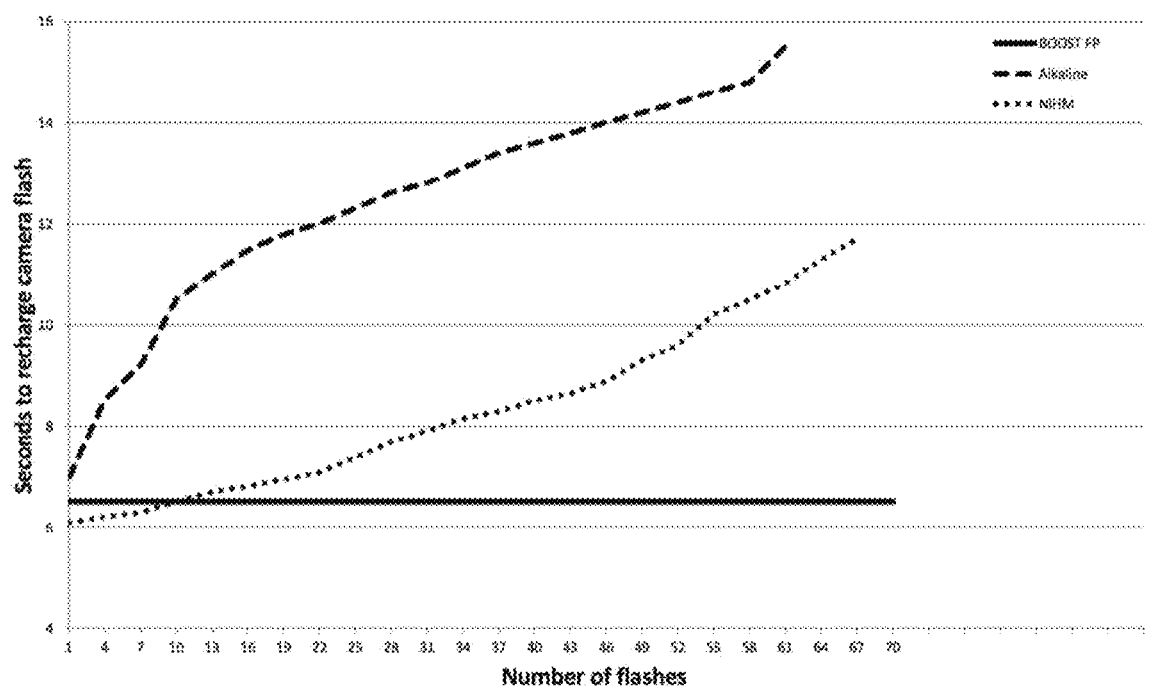
FIG. 20 is a graph showing expected results for several types of batteries when used over time to recharge external camera flash with continuous use.

FIG. 20 is a graph showing expected results for several types of batteries when used over time to recharge external camera flash with continuous use. The lower the line in the graph, the faster the camera charges the flash. The battery of the present invention is referred to a 'Revolt Pro' in that graph. As it can be seen from FIG. 20, with use of the battery of the present invention, it is no longer necessary for the user to wait longer and longer for their camera flash to recharge and the user's camera flash will recharge at the same fast rate until the battery is flat.

Advantages of the Invention

Some of the advantages or benefits of the inventions are as follows:

The battery may be rechargeable which means it can be used again and again so is cost effective after multiple uses.

Environmentally friendly as compared to all previously known non rechargeable/single use batteries as the battery according to some embodiments of the present invention is rechargeable and re-useable.

Excellent performance in high current devices

Suitable for all types of devices

Intelligent regulated output resulting in the best possible performance

Intelligent electronics to sense the type of battery charger or voltage supplied by a battery charger (such as from existing battery chargers, for example: NiMH/NiCD/Li-ion chargers) and to adjust the voltage to charge the internal cell or rechargeable power source such as a Li-ion cell The battery provides continuous high power until it is flat In one option, no special battery charger is required and the battery may be charged with all commercially available NiMH/NiCD/Li-ion battery chargers. For example, the advanced electronics inside the battery of the present invention boost the voltage supplied by a NiMH battery charger to provide a regulated safe charge for a Li-ion cell.

Other advantages include:

The power source such as a Li-ion cell inside the battery of the present invention can be recharged up to 1000 times without a significant loss of capacity. This means that if you recharge the battery every week, it will still have 80% of the original capacity after about 20 years. It will then last many more years, just with a lower power capacity.

A 2100 mAh AA NiMH battery is rated at 2520 mWh (1.2v×2100 mAh) whereas the AA version of the battery of the present invention is rated at 2900 mWh. Therefore, the present battery of the present invention contains more power than a 2100 mAh NiMH battery. The useable capacity will depend on minimum voltage required by the user's electronic device. It will also vary slightly depending on the discharge rate. If the user's electronic device/product requires at least 1.1V to operate, the battery of the present invention is equivalent to around a 2400 mAh NiMH battery. If the user's electronics require at least 1.15V to operate, the battery of the present invention is equivalent to around a 2600 mAH to 2700 mAH NiMH battery.

The electronics inside the battery of the present invention are intended to be always turned on. The quiescent current drain of the electronics is a relatively tiny 30 μA which drains less power than the self-discharge rate.

30 μA=0.03 mA 12 months=365 days×24 hrs/day=8760 hours mAh drain over one year=8760×0.03=262.8 mAh The self-discharge for power source such as a Li-ion cell over one year is about 20%. So the total power left after 12 months will still be over 1000 mAh for the AA battery of the present invention.

The power source in the battery of the present invention does not run fully flat. When it gets to a safe low voltage the electronics in the battery turns off the output, thereby protecting the power source such as the Li-ion cell.

Variations

It will of course be realized that while the foregoing has been given by way of illustrative example of this invention, all such and other modifications and variations thereto as would be apparent to perons skilled in the art are deemed to fall within the broad scope and ambit of this invention as is hereinbefore described.

Even though the invention has been described with reference to AA/AAA batteries the battery of the present invention can be of any type or size such as but not limited to AA, AAA, C, D, 9V, lantern batteries etc.

The voltage regulation circuits as described hereinbefore with reference to the drawings are only examples of several possible voltage regulation circuits that a person skilled in the art would consider to be used for the same or substantially similar purpose.

Similarly, several components of the voltage regulation circuits as described hereinbefore with reference to the drawings need not necessarily resemble the arrangement as depicted in the drawings and each of these components may be replaced with any suitable equivalent component(s) that a person skilled would envisage as being suitable for providing the same or substantially similar purpose.

A person skilled in the art will appreciate that several other alternative form of electronic controller(s) such as programmed microprocessor; Application Specific Integrated Circuit (ASIC); Programmable Logic Array (PLA); Field Programming Gate Array (FPGA); or any other form of electronic or a logic circuit or a programmable logic device suitable for the purpose may be implemented in the voltage regulation circuit. Such electronic controller(s) may be operatively connected to one or more of the other electronic components of the voltage regulation device to send and receive input and output signals and thereby to sense and regulate the output voltage in the programmed variable level. The internal power source need not be limited to Li-ion cell and may be a power source that is suitable for the purpose. The basic electronic design would remain the same with different power source and changes can be made to suit the particular power source output voltage and charging requirements. Although Li-ion is preferable as a power source, other possible power sources that can be used are NiMH or NiCD. Emerging high technology rechargeable cells can also be used such as thin film lithium.

It is to be understood that the batteries of the present invention can be charged using existing chargers and do not require special chargers. However, special chargers can be developed for the batteries of the present invention.

It will also be understood that where a product, method or process as herein described or claimed and that is sold incomplete, as individual components, or as "kit of parts", that such exploitation will fall within the ambit of the invention.

For the purposes of the description above, the terms "upper", "lower", "right", left", "vertical", "horizontal", "top", "bottom", "lateral", "longitudinal", "side", "front", "rear" and derivatives thereof shall relate to the invention as it is oriented in the drawings/figures. However, it is to be understood that the invention may assume various alternative variations, except where expressly specified to the contrary. It is also to be understood that the specific devices illustrated in the attached drawings, and described in the specification are simply exemplary embodiments of the invention. Hence, specific dimensions and other physical characteristics related to the embodiments disclosed herein are not to be considered as limiting.

What I claim is:

1. A battery comprising:
   an external surface of the battery which is substantially defined by:
      a housing;
      a positive terminal; and
      a negative terminal;
   wherein the housing contains:
      a rechargeable power source;
      a programmable controller;
      an output current sensor configured to measure an output current output by the battery; and
      a voltage regulation device that is operatively connected to the positive terminal, the negative terminal and the power source, wherein the voltage regulation device is configured to provide an output voltage between the positive terminal and the negative terminal;
   wherein the voltage regulation device comprises:
      a switching regulator configured to selectively provide the output voltage; and
      a linear regulator configured to selectively provide the output voltage;
      wherein the output current sensor is configured to provide information on the output current to the programmable controller, and
      further wherein when the output current is below a pre-determined threshold, the programmable controller is configured to disable the switching regulator and enable the linear regulator, and when the output current is above the pre-determined threshold, the programmable controller is configured to enable the switching regulator and disable the linear regulator.

2. The battery as in claim 1, wherein the switching regulator is a buck regulator.

3. The battery as in claim 1, wherein the output voltage level is between 1.2V and 1.5V.

4. The battery in claim 1, wherein the controller is configured to provide a lower output voltage if a voltage of the power source is below a pre-determined level compared to the output voltage when the voltage of the power source is above the pre-determined level.

5. The battery as claimed in claim 1, further comprising a voltage level indicator configured to provide an indication of a voltage level or capacity of the power source.

6. The battery as claimed in claim 1, wherein the power source is a Li-ion cell.

7. A voltage regulation device configured to be housed within a housing of a battery, the battery having an external surface which is substantially defined by a housing, a positive terminal, and a negative terminal, the battery having a power source, an output current sensor configured to measure an output current output by the battery, and a programmable controller,
wherein the voltage regulation device is configured to operatively connect to the positive terminal, the negative terminal and the power source to provide an output voltage between the positive terminal and the negative terminal,
the voltage regulation device comprising:
   a switching regulator configured to selectively provide the output voltage; and
   a linear regulator configured to selectively the output voltage;
   wherein the output current sensor is configured to provide information on the output current to the programmable controller, and
   further wherein when the output current is below a pre-determined threshold, the programmable controller is configured to disable the switching regulator and enable the linear regulator, and when the output current is above the pre-determined threshold, the programmable controller is configured to enable the switching regulator and disable the linear regulator.

8. The voltage regulation device is claimed in claim 7, wherein the switching regulator is a buck regulator.

9. The voltage regulation device as claimed is claim 7, wherein the output voltage level is between 1.2V and 1.5V.

10. The battery as claimed in claim 1, wherein the switching regulator is a synchronous buck regulator.

11. The battery as claimed in claim 1, wherein the linear regulator is a low-drop-out (LDO) regulator.

12. The voltage regulation device as claimed in claim 7, wherein the linear regulator is a low-drop-out (LDO) regulator.

13. The voltage regulation device as claimed in claim 7, wherein the programmable controller is configured to provide a lower output voltage if a voltage of the power source is below a pre-determined level compared to the output voltage when the voltage of the power source is above the pre-determined level.

* * * * *